(12) United States Patent
Nagamine et al.

(10) Patent No.: US 9,985,477 B2
(45) Date of Patent: May 29, 2018

(54) POWER TRANSMITTING APPARATUS, POWER RECEIVING APPARATUS, CONTROL METHODS THEREFOR, PROGRAM, AND COMPUTER-READABLE STORAGE MEDIUM

(71) Applicant: CANON KABUSHIKI KAISHA, Tokyo (JP)

(72) Inventors: Kazuhide Nagamine, Kawasaki (JP); Tomoaki Hokyo, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 9 days.

(21) Appl. No.: 14/907,972

(22) PCT Filed: Sep. 10, 2014

(86) PCT No.: PCT/JP2014/074608
§ 371 (c)(1),
(2) Date: Jan. 27, 2016

(87) PCT Pub. No.: WO2015/045991
PCT Pub. Date: Apr. 2, 2015

(65) Prior Publication Data
US 2016/0190870 A1    Jun. 30, 2016

(30) Foreign Application Priority Data
Sep. 30, 2013 (JP) .................. 2013-205354

(51) Int. Cl.
*H02J 3/12* (2006.01)
*H02J 50/10* (2016.01)
(Continued)

(52) U.S. Cl.
CPC .............. *H02J 50/10* (2016.02); *H02J 5/005* (2013.01); *H02J 50/40* (2016.02); *H02J 50/80* (2016.02); *H04B 5/0037* (2013.01)

(58) Field of Classification Search
CPC .. H02J 50/10; H02J 50/40; H02J 50/80; H02J 5/005; H02J 17/00; H04B 5/0037
See application file for complete search history.

(56) References Cited

U.S. PATENT DOCUMENTS 8,143,745 B2    3/2012  Shiozaki et al.
8,299,652 B2 *  10/2012  Sample .................. H02J 5/005
                                                          307/104
(Continued)

FOREIGN PATENT DOCUMENTS

JP    2006-031259 A    2/2006
JP    2010-028937 A    2/2010
(Continued)

OTHER PUBLICATIONS http://ja.idt.com/about/press-room/idt-announces-industry%E2%80%99s-first-dual-mode-wireless-power-receiver-ic-compatible-both-wpc-and-pma-stan (Apr. 24, 2013).
(Continued)

*Primary Examiner* — Kenneth B Wells
(74) *Attorney, Agent, or Firm* — Fitzpatrick, Cella, Harper & Scinto

(57) ABSTRACT

A power transmitting apparatus transmits power by a first wireless power transmission method, transmits power by a second wireless power transmission method, detects a wireless power transmission method supported by a power receiving apparatus, and determines whether power is transmitted to a first power receiving apparatus by the first power transmission method or the second power transmission method, based on a detected wireless power transmission method supported by the first power receiving apparatus and a detected wireless power transmission method supported by a second power receiving apparatus.

22 Claims, 9 Drawing Sheets

(51) Int. Cl.
*H02J 5/00* (2016.01)
*H04B 5/00* (2006.01)
*H02J 50/80* (2016.01)
*H02J 50/40* (2016.01)

(56) References Cited

U.S. PATENT DOCUMENTS

| | | | |
|---|---|---|---|
| 8,830,036 B2 | 9/2014 | Park et al. | |
| 8,892,033 B2 | 11/2014 | Terada et al. | |
| 9,306,401 B2* | 4/2016 | Lee | H02J 7/00 |
| 9,407,327 B2 | 8/2016 | Kirby et al. | |
| 9,444,289 B2* | 9/2016 | Park | H02J 17/00 |
| 9,461,712 B2 | 10/2016 | Miyabayashi et al. | |
| 9,692,251 B2* | 6/2017 | Sever | H02J 7/025 |
| 9,705,338 B2* | 7/2017 | Kanno | H02J 5/005 |
| 2011/0080051 A1 | 4/2011 | Lee et al. | |
| 2013/0057078 A1 | 3/2013 | Lee et al. | |
| 2013/0093388 A1 | 4/2013 | Partovi | |
| 2013/0221915 A1 | 8/2013 | Son et al. | |
| 2014/0183964 A1 | 7/2014 | Walley | |
| 2015/0091386 A1 | 4/2015 | Nagamine et al. | |

FOREIGN PATENT DOCUMENTS

| | | |
|---|---|---|
| JP | 2010-268665 A | 11/2010 |
| JP | 2011-120361 A | 6/2011 |
| JP | 2011-244683 A | 12/2011 |
| JP | 2012-125112 A | 6/2012 |
| JP | 2012-518381 A | 8/2012 |
| JP | 2012-175798 A | 9/2012 |
| JP | 2012-239360 A | 12/2012 |
| WO | 2012/169861 A2 | 12/2012 |

OTHER PUBLICATIONS

Office Action dated Sep. 4, 2017, in Chinese Patent Application No. 201480054133.5.
Office Action in Japanese Patent Application No. 2017133042, dated Jan. 26, 2018.

* cited by examiner

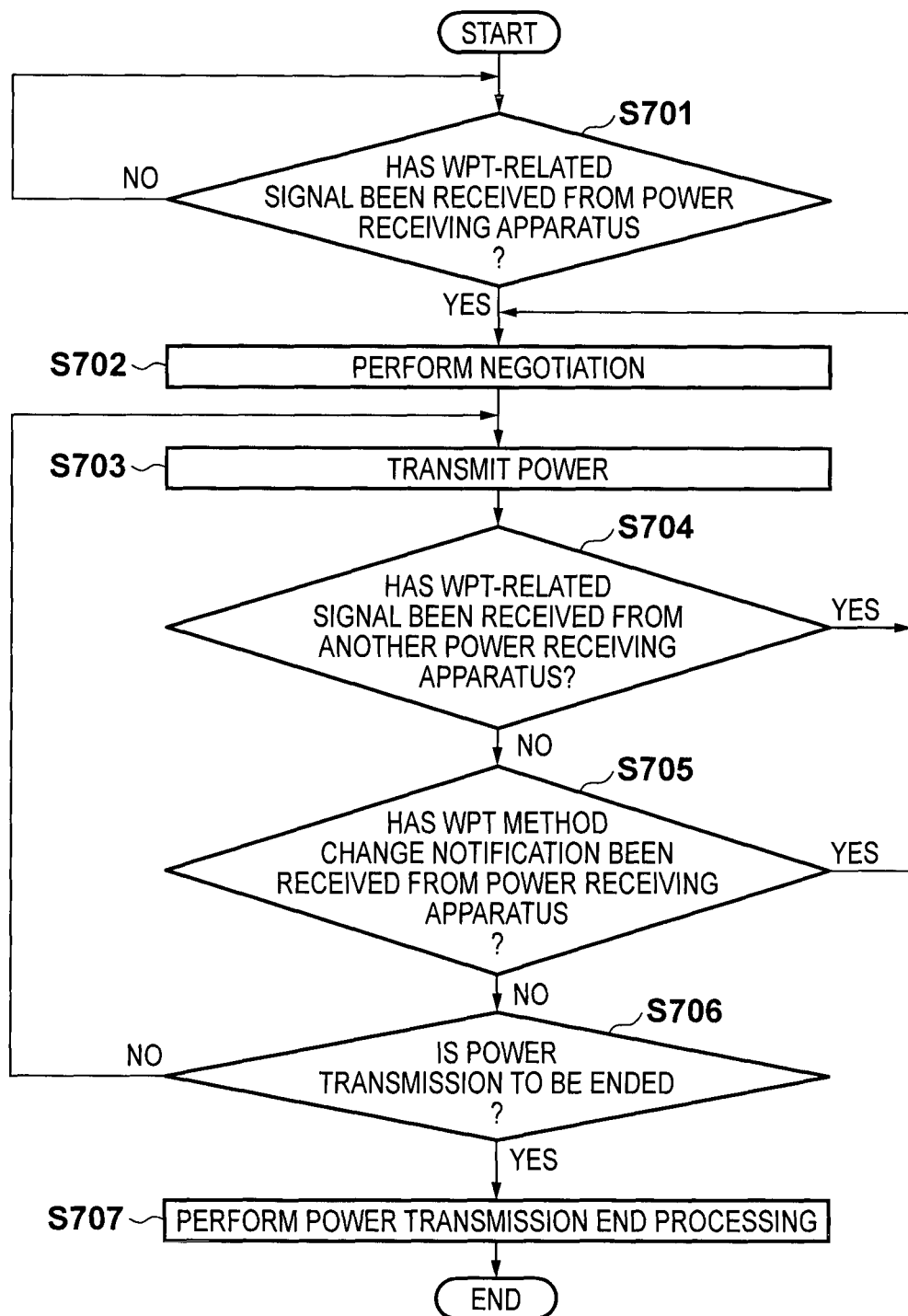

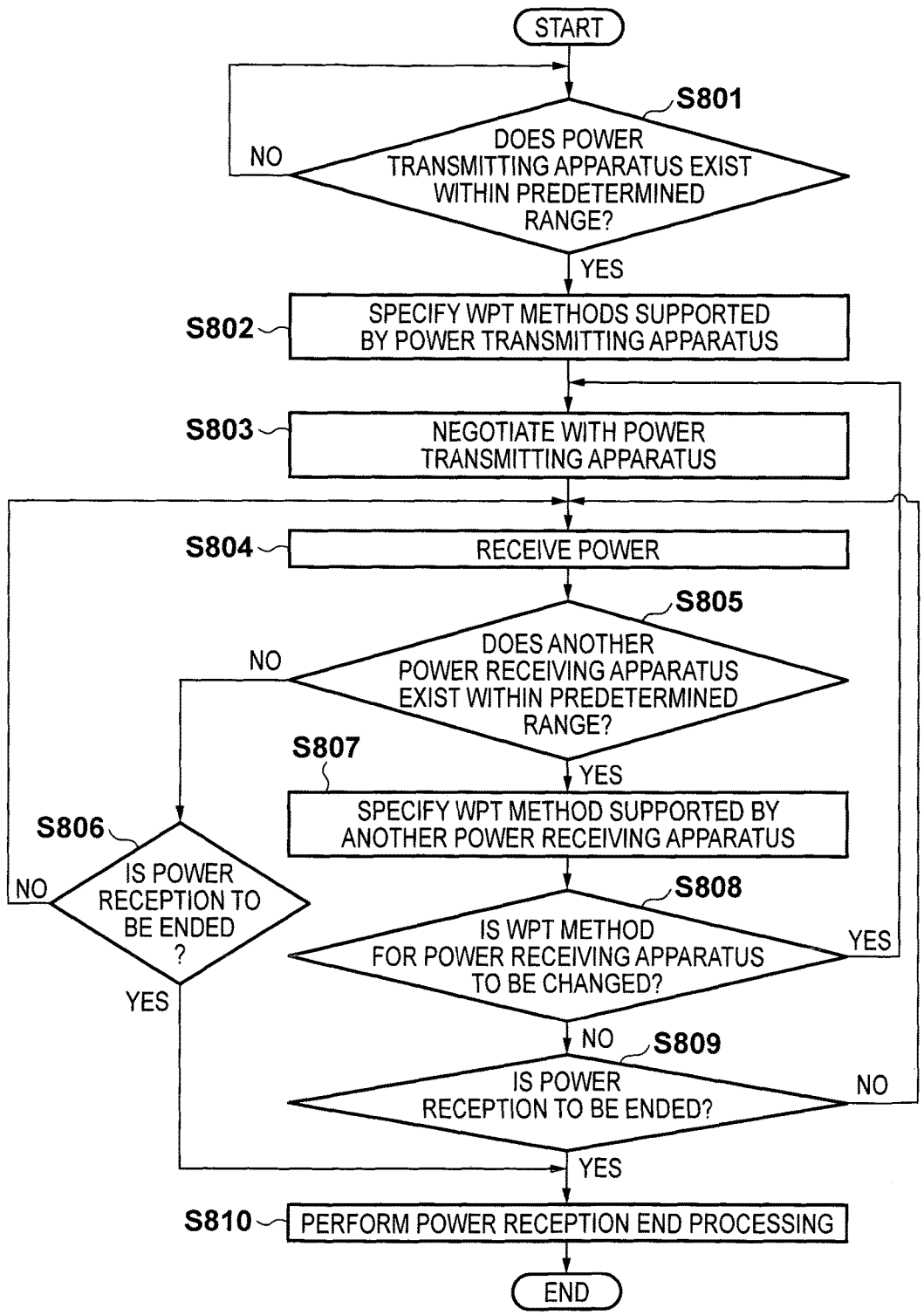

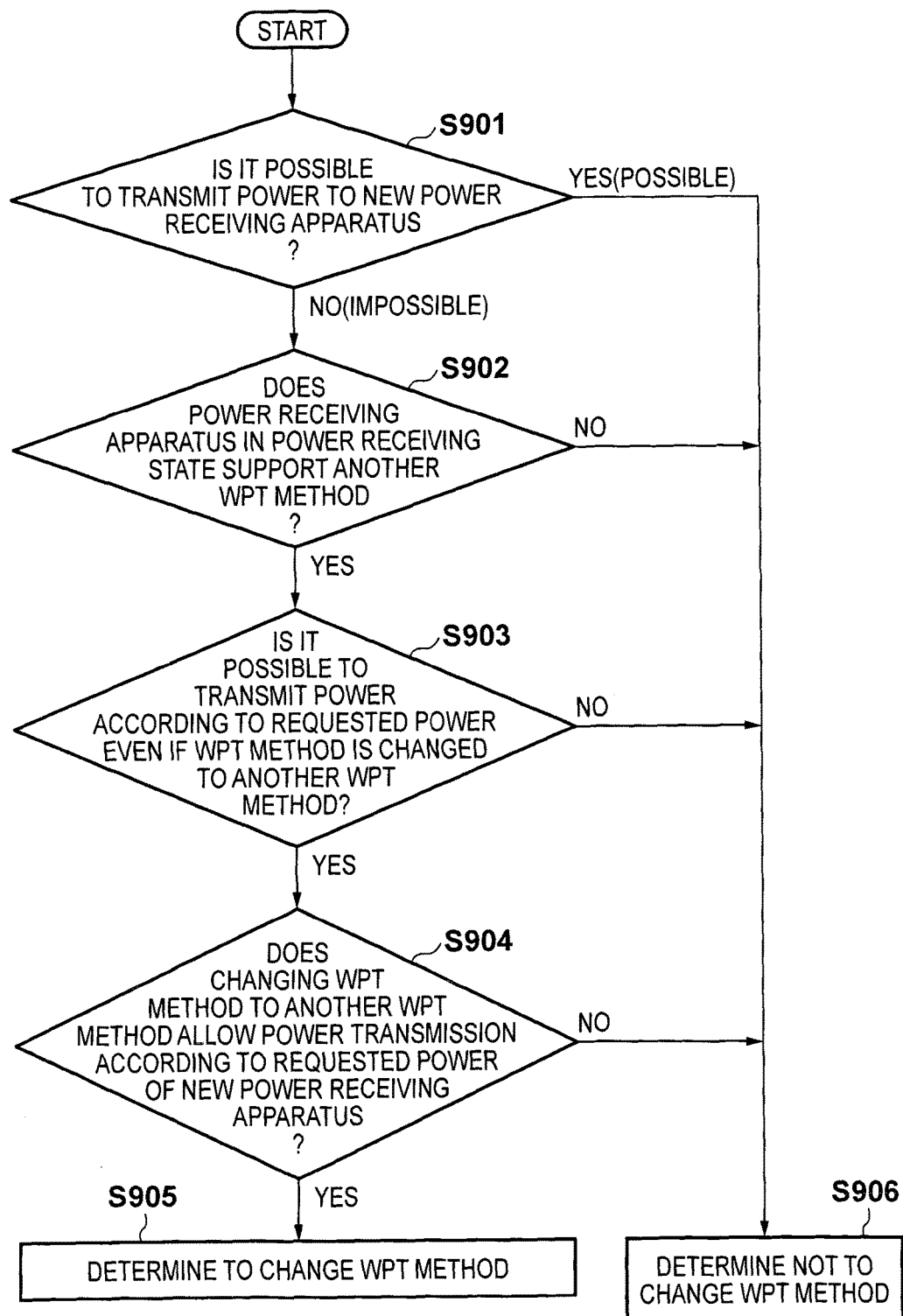

POWER TRANSMITTING APPARATUS, POWER RECEIVING APPARATUS, CONTROL METHODS THEREFOR, PROGRAM, AND COMPUTER-READABLE STORAGE MEDIUM

TECHNICAL FIELD

The present invention relates to a power transmitting apparatus, power receiving apparatus, control methods therefor, program, and computer-readable storage medium for wireless power transmission.

BACKGROUND ART

At present, there are known various methods for performing wireless power transmission, such as a electromagnetic induction method and magnetic resonance method. There exist a plurality of standards for ensuring mutual connectivity between a power transmitting apparatus and a power receiving apparatus in a wireless power transmission system. The web site, http://ja.idt.com/about/press-room/idt-announces-industry%E2%80%99s-first-dual-mode-wireless-power-receiver-ic-compatible-both-wpc-and-pma-stan describes an IC chip supporting a plurality of standards about wireless power transmission.

In a system supporting a plurality of wireless power transmission methods (WPT methods), the efficiency of wireless power transmission may decrease depending on a wireless power transmission method used for power transmission. For example, a case in which a power transmitting apparatus supports the first WPT method (the upper limit of transmission power is 5 W) and the second WPT method (the upper limit of transmission power is 10 W) will be described. In this case, if the power transmitting apparatus transmits, by the first WPT method, a power of 5 W to a power receiving apparatus (supporting the first and second WPT methods) that has been placed first on a charging stand, it may be impossible to charge a power receiving apparatus supporting only the first WPT method during power transmission to the power receiving apparatus.

SUMMARY OF INVENTION

The present invention has been made to solve the above-described problem, and improves the efficiency of wireless power transmission in a system supporting a plurality of wireless power transmission methods.

According to first aspect of the present invention, there is provided a power transmitting apparatus comprising: first power transmitting means for transmitting power by a first wireless power transmission method; second power transmitting means for transmitting power by a second wireless power transmission method; detection means for detecting a wireless power transmission method supported by a power receiving apparatus; and determination means for determining whether power is transmitted to a first power receiving apparatus by the first power transmitting means or the second power transmitting means, based on a wireless power transmission method supported by the first power receiving apparatus and detected by the detection means, and a wireless power transmission method supported by a second power receiving apparatus and detected by the detection means.

According to second aspect of the present invention, there is provided a control method for a power transmitting apparatus, comprising: a first power transmitting step of transmitting power by a first wireless power transmission method; a second power transmitting step of transmitting power by a second wireless power transmission method; a detection step of detecting a wireless power transmission method supported by a power receiving apparatus; and a determination step of determining whether power is transmitted to a first power receiving apparatus in the first power transmitting step or the second power transmitting step, based on a wireless power transmission method supported by the first power receiving apparatus and detected in the detection step, and a wireless power transmission method supported by a second power receiving apparatus and detected in the detection step.

According to third aspect of the present invention, there is provided a program for causing a computer to execute a first power transmitting procedure of transmitting power by a first wireless power transmission method, a second power transmitting procedure of transmitting power by a second wireless power transmission method, a detection procedure of detecting a wireless power transmission method supported by a power receiving apparatus, and a determination procedure of determining whether power is transmitted to a first power receiving apparatus in the first power transmitting procedure or the second power transmitting procedure, based on a wireless power transmission method supported by the first power receiving apparatus and detected in the detection procedure, and a wireless power transmission method supported by a second power receiving apparatus and detected in the detection procedure.

According to fourth aspect of the present invention, there is provided a first power receiving apparatus for receiving power wirelessly supplied from a power transmitting apparatus, comprising: detection means for detecting a wireless power transmission method supported by a second power receiving apparatus; and instruction means for instructing, to the power transmitting apparatus, a wireless power transmission method to be used for power transmission to the first power receiving apparatus based on a wireless power transmission method supported by the first power receiving apparatus and the wireless power transmission method supported by the second power receiving apparatus and detected by the detection means.

According to fifth aspect of the present invention, there is provided a control method for a first power receiving apparatus for receiving power wirelessly supplied from a power transmitting apparatus, comprising: a detection step of detecting a wireless power transmission method supported by a second power receiving apparatus; and an instruction step of instructing, to the power transmitting apparatus, a wireless power transmission method to be used for power transmission to the first power receiving apparatus based on a wireless power transmission method supported by the first power receiving apparatus and the wireless power transmission method supported by the second power receiving apparatus and detected in the detection step.

According to sixth aspect of the present invention, there is provided a program for causing a computer to execute a detection procedure of detecting a wireless power transmission method supported by a second power receiving apparatus; and an instruction procedure of instructing, to a power transmitting apparatus, a wireless power transmission method to be used for power transmission to a first power receiving apparatus for receiving power wirelessly supplied from the power transmitting apparatus, based on a wireless power transmission method supported by the first power receiving apparatus and the wireless power transmission method supported by the second power receiving apparatus and detected in the detection procedure.

Further features of the present invention will become apparent from the following description of exemplary embodiments with reference to the attached drawings.

BRIEF DESCRIPTION OF DRAWINGS

FIG. 7 is a flowchart for explaining the operation of the power transmitting apparatus 101 according to the second embodiment;

FIG. 8 is a flowchart for explaining the operation of the power receiving apparatus 103 according to the second embodiment; and FIG. 9 is a flowchart for explaining processing of determining whether to change a WPT method.

DESCRIPTION OF EMBODIMENTS

The present invention will be described in detail below with reference to the accompanying drawings. Note that arrangements shown in the following embodiments are merely examples, and the present invention is not limited to the illustrated arrangements.

<First Embodiment>

Figure 1:
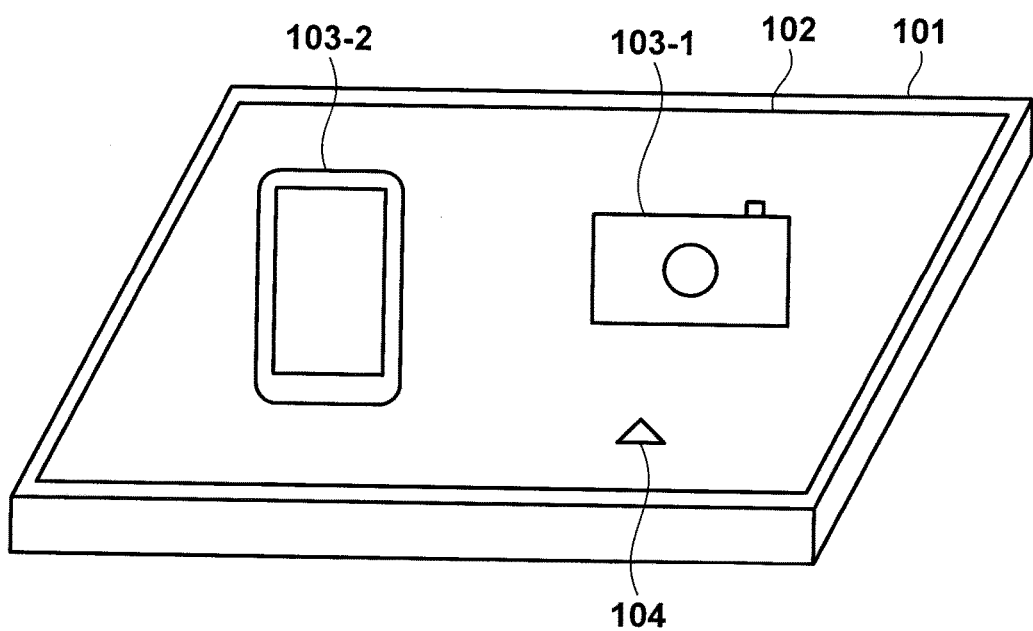
FIG. 1 is a schematic view according to the first embodiment.

FIG. 1 is a schematic view for explaining an example of the use scene of the embodiment. As shown in FIG. 1, a plurality of power receiving apparatuses 103 (power receiving apparatuses 103-1 and 103-2) exist within a power transmission range 102 of a power transmitting apparatus 101. Note that the power transmitting apparatus 101 can be set in an electric appliance such as a notebook PC, DVD recorder, or video recorder, or furniture such as a table, desk, or television stand. A case in which the power receiving apparatuses 103 are a digital camera and smart phone will be explained with reference to FIG. 1. However, the present invention is also applicable to various electric appliances such as a video camera, notebook PC, and feature phone. Each power receiving apparatus 103 is capable of receiving power wirelessly transmitted from the power transmitting apparatus 101. Each power receiving apparatus 103 can charge a battery or drive an apparatus using the received power.

In this embodiment, a case in which the power transmitting apparatus 101 supports three wireless power transmission methods (WPT methods) shown in Table 1 will be explained. Note that the present invention is not limited to this, and the power transmitting apparatus 101 can support a plurality of WPT methods. Furthermore, in this embodiment, a case in which the power transmitting apparatus 101 decides one of the supported three WPT methods to be used for power transmission to each power receiving apparatus 103 will be described.

TABLE 1

| method number | control communication for power transmission | enabling/disabling of power transmission to plural power receiving apparatuses | amount of transmissible power (total value) |
|---|---|---|---|
| 1 | load modulation | disabled (up to one) | 5 W |
| 2 | Bluetooth | enabled (up to three) | 20 W |
| 3 | IEEE802.11n | enabled (up to 10) | 50 W |

In Table 1, the control communication method for power transmission as the first WPT method is load modulation, the control communication method for power transmission as the second WPT method is Bluetooth®, and the control communication method for power transmission as the third WPT method is IEEE802.11n. The communicable distances of IEEE802.11n and Bluetooth® are longer than that of load modulation.

Note that although FIG. 1 shows a case in which the two power receiving apparatuses 103 exist within the power transmission range, three or more power receiving apparatuses 103 can be arranged within the power transmission range 102. The power transmitting apparatus 101 of this embodiment can perform wireless power transmission to the plurality of power receiving apparatuses 103 existing within the power transmission range.

Figure 2:
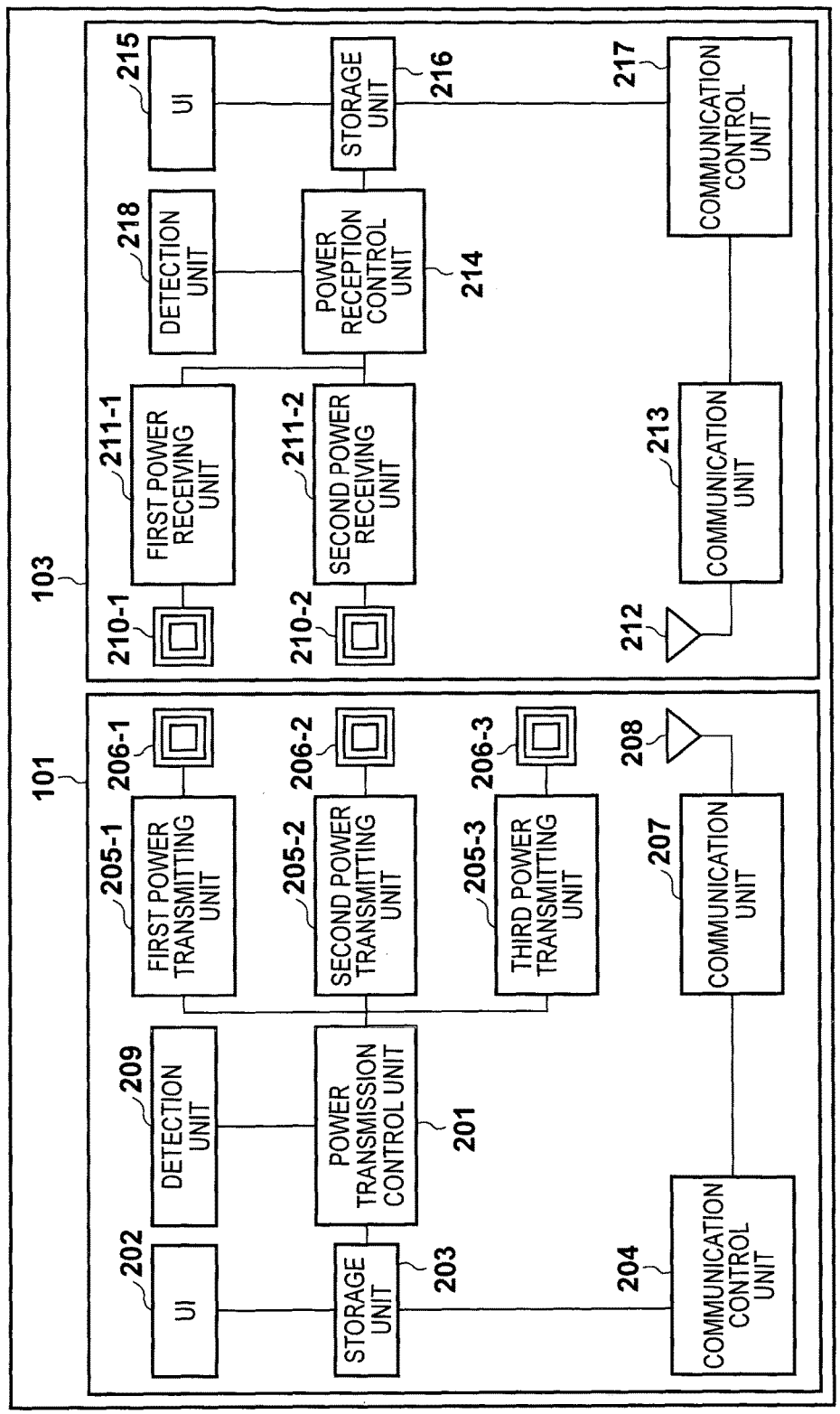
FIG. 2 is a block diagram showing an example of the functional arrangement of a power transmitting apparatus 101 and power receiving apparatus 103 according to the first embodiment.

The arrangement of the power transmitting apparatus 101 and each power receiving apparatus 103 according to this embodiment will be described with reference to FIG. 2. FIG. 2 is a block diagram for explaining the functional arrangement of the power transmitting apparatus 101 and each power receiving apparatus 103. The power transmitting apparatus 101 is configured to include a power transmission control unit 201, a UI (User Interface) 202, a storage unit 203, a communication control unit 204, a plurality of power transmitting units 205, a plurality of power transmitting antennas 206, a communication unit 207, a communication antenna 208, and a detection unit 209. In this embodiment, the different power transmitting units 205 and power transmitting antennas 206 exist for the respective WPT methods. However, a plurality of WPT methods may share one power transmitting unit 205 and one power transmitting antenna 206.

The power transmission control unit 201 decides one of the plurality of wireless power transmission methods (WPT methods) supported by the power transmitting apparatus 101 to be used to transmit power to the power receiving apparatus 103 within the power transmission range. An overview of the WPT methods supported by the power transmitting apparatus 101 of this embodiment is as shown in Table 1 described above. The power transmission control unit 201 changes a WPT method used for power transmission to the power receiving apparatus 103-1 in accordance with a WPT method supported by a power receiving apparatus 103-N newly detected by the detection unit 209 after the start of power transmission to the power receiving apparatus 103-1. That is, the power transmission control unit 201 can switch between the first and second wireless power transmission methods. A WPT method decision method and WPT method change method by the power transmission control unit 201 will be described later.

The UI 202 serves as an interface used by the user to make various settings in the power transmitting apparatus 101. The storage unit 203 stores, for example, various kinds of information to be used by the power transmission control unit 201 to decide a WPT method or change a WPT method. The information stored in the storage unit 203 will be described later. The communication control unit 204 controls the communication unit 207 to implement communication with the power receiving apparatus 103. The communication unit 207 implements communication with the power receiving apparatus 103 via the communication antenna 208 under the control of the communication control unit 204. In this embodiment, it is possible to perform communication associated with various control operations for wireless power transmission by using the communication unit 207. Note that the communicable range (communication range) of the communication unit 207 is wider than the power transmission range 102.

The power transmitting unit 205 controls various parameters such as a current value or voltage value to be applied to the power transmitting antenna 206 under the control of the power transmission control unit 201, and implements wireless power transmission to the power receiving apparatus 103. Note that the power transmitting apparatus 101 of this embodiment includes the power transmitting units 205 and power transmitting antennas 206, the numbers of which are equal to that of supported WPT methods. The detection unit 209 detects that the power receiving apparatuses 103 exist within the power transmission range 102 of the power transmitting apparatus 101. The detection unit 209 can also detect a specific position in the power transmission range, at which the specific power receiving apparatus 103 exists.

Each power receiving apparatus 103 is configured to include power receiving antennas 210, power receiving units 211, a communication antenna 212, a communication unit 213, a power reception control unit 214, a UI (User Interface) 215, a storage unit 216, a communication control unit 217, and a detection unit 218. The power reception control unit 214 controls the power receiving unit 211 to be able to receive power transmitted by the WPT method decided by the power transmitting apparatus 101. The power reception control unit 214 is connected to a rechargeable battery, and charges the battery by the power received by the power receiving unit 211. Note that the power reception control unit 214 can control to directly use the power received from the power transmitting apparatus 101 as the power supply of a processor, instead of charging the battery.

The UI 215 serves as an interface used by the user to make various settings in the power receiving apparatus 103. The storage unit 216 is used to, for example, store information about the settings input through the UI 215. The communication control unit 217 controls the communication unit 213 to implement communication with the power transmitting apparatus 101. The communication unit 213 implements communication with the power transmitting apparatus 101 via the communication antenna 212 under the control of the communication control unit 217. In this embodiment, it is possible to perform communication associated with various control operations for wireless power transmission by using the communication unit 213.

Note that the power receiving apparatus 103 shown in FIG. 2 supports the first and second WPT methods shown in Table 1. The power receiving apparatus 103 shown in FIG. 2 includes the two power receiving antennas 210 and the two power receiving units 211. This embodiment assumes a case in which the plurality of power receiving apparatuses 103 such as a power receiving apparatus 103 supporting only one WPT method and a power receiving apparatus 103 supporting three WPT methods exist within the power transmission range 102 of the power transmitting apparatus 101. If the first and second WPT methods can share the power receiving antenna 210 and power receiving unit 211, it is possible to implement the power receiving apparatus 103 by one power receiving antenna 210 and one power receiving unit 211.

Figure 3:
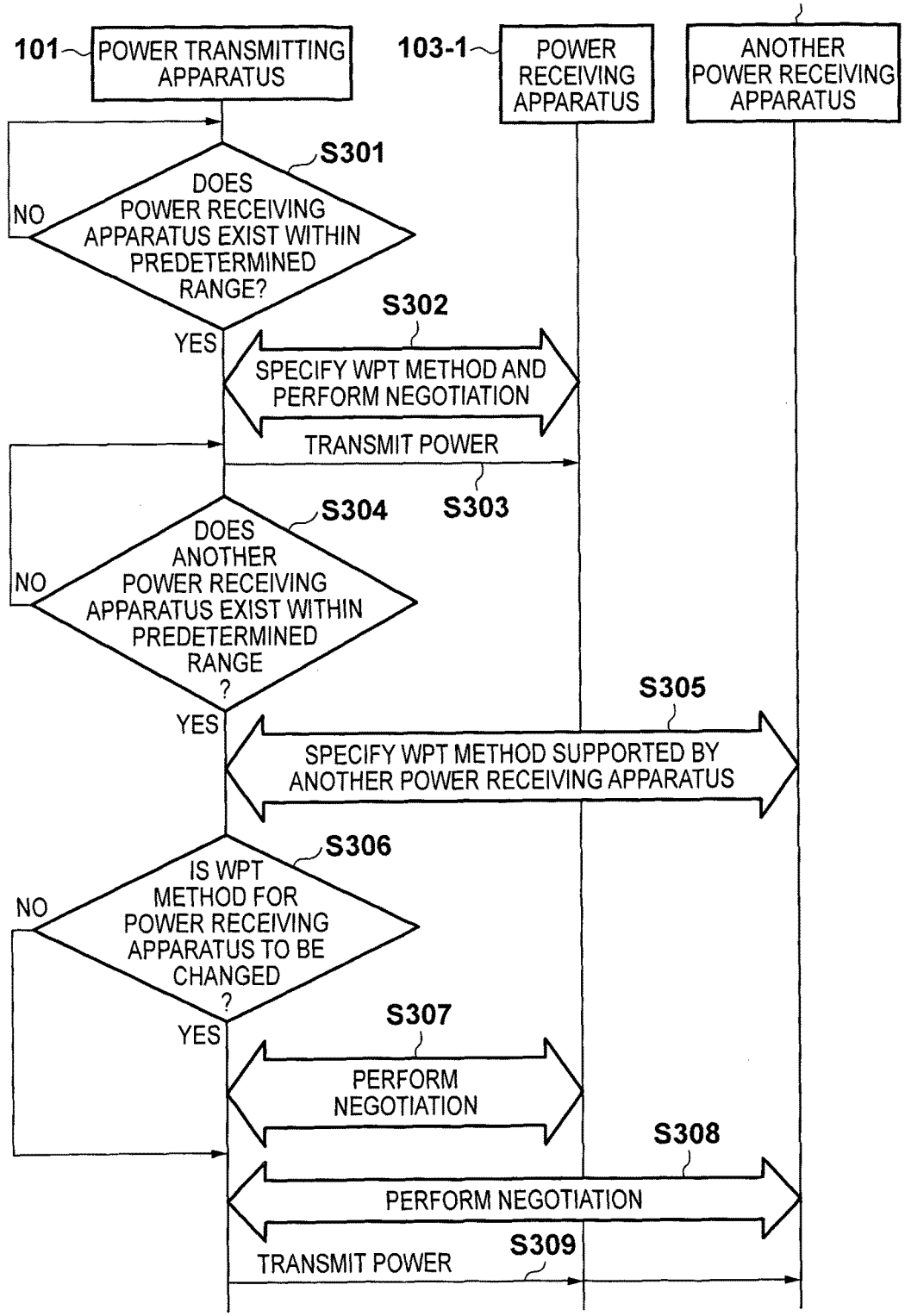
FIG. 3 is a sequence chart for explaining the operation of the power transmitting apparatus 101 and power receiving apparatuses 103 according to the first embodiment.

The operation of the power transmitting apparatus 101 and power receiving apparatuses 103 according to this embodiment will be described with reference to a sequence chart shown in FIG. 3. FIG. 3 is a sequence chart for explaining the operation of the power transmitting apparatus 101 and power receiving apparatuses 103 according to this embodiment. In S301 of FIG. 3, the power transmitting apparatus 101 determines whether a power receiving apparatus exists within the power transmission range 102 (predetermined range). If the power transmitting apparatus 101 determines that the power receiving apparatus 103-1 exists within the power transmission range (YES in S301), it negotiates with the power receiving apparatus 103-1 while specifying a WPT method supported by the power receiving apparatus 103-1 (S302).

A WPT method specifying method is not specifically limited, and the following methods can be adopted. For example, the power transmitting apparatus 101 can transmit an inquiry signal of each of the first, second, and third WPT methods to the power receiving apparatus 103-1, and specify the WPT method supported by the power receiving apparatus 103-1 based on a response from the power receiving apparatus 103-1. If the power transmitting apparatus 101 receives a response to the first inquiry signal and that to the second inquiry signal from the power receiving apparatus 103-1, it determines that the power receiving apparatus 103-1 supports the first and second WPT methods. Note that the inquiry signal of the first WPT method is a signal complying with a format and a communication method defined as the first WPT method. The inquiry signal of the second WPT method is a signal complying with a format and a communication method defined as the second WPT method. The inquiry signal of the third WPT method is a signal complying with a format and a communication method defined as the third WPT method. As another method of specifying the WPT method supported by the power receiving apparatus 103-1, for example, there is provided a method of transmitting an inquiry message from the power transmitting apparatus 101. Upon receiving the inquiry message, the power receiving apparatus 103-1 transmits, as a response, identification information of the WPT method supported by itself. In this way, the power transmitting apparatus 101 can specify the WPT method supported by the power receiving apparatus 103-1.

If the power transmitting apparatus 101 determines that the power receiving apparatus 103-1 supports a plurality of WPT methods among the first, second, and third WPT methods, it decides one of the WPT methods to be used for power transmission. A WPT method decision method is not specifically limited. For example, the power transmitting apparatus 101 can decide, as a WPT method to be used for power transmission to the power receiving apparatus 103-1, a WPT method by which it is possible to transmit power to a larger number of power receiving apparatuses at the same time. According to the above decision method, when the power receiving apparatus 103-1 supports the first and second WPT methods, the power transmitting apparatus 101 decides to use the second WPT method for power transmission to the power receiving apparatus 103-1 based on Table 1. Note that the present invention is not limited to this, if the second WPT method is already used for power transmission to another power receiving apparatus 103-X.

As another decision method, the power transmitting apparatus 101 can decide, as a WPT method to be used for power transmission to the power receiving apparatus 103-1, a WPT method by which a larger amount of power can be transmitted. According to the above decision method, when the power receiving apparatus 103-1 supports the first and second WPT methods, the power transmitting apparatus 101 decides to use the second WPT method for power transmission to the power receiving apparatus 103-1 based on Table 1. Note that the present invention is not limited to this, if the second WPT method is already used for power transmission to the other power receiving apparatus 103-X.

After deciding the WPT method to be used for power transmission to the power receiving apparatus 103-1, the power transmitting apparatus 101 negotiates with the power receiving apparatus 103-1 according to the decided WPT method. In the negotiation according to this embodiment, the power transmitting apparatus 101 acquires, from the power receiving apparatus 103-1, control information such as the charging status (0% to 100%), requested power amount (for example, 5 W), and current power consumption amount of the power receiving apparatus 103-1. Based on the acquired various kinds of information about the power receiving apparatus 103-1, the power transmitting apparatus 101 decides parameters such as a driving frequency and a current value or voltage value to be applied to the power transmitting antenna 206. Upon completion of the negotiation, the power transmitting apparatus 101 transmits power to the power receiving apparatus 103-1 (S303).

After the start of power transmission, the power transmitting apparatus 101 determines whether the new power receiving apparatus 103-N exists within the power transmission range 102 (predetermined range) (S304). If the power transmitting apparatus 101 determines that no power receiving apparatus 103-N exists (NO in S304), it determines whether to end power transmission. If the power transmitting apparatus 101 determines to end power transmission, it performs power transmission end processing. On the other hand, if the power transmitting apparatus 101 determines not to end power transmission, it continues power transmission to the power receiving apparatus 103-1. A power transmission end condition includes, for example, various errors in the power transmitting apparatus 101, the full charge state of the power receiving apparatus 103-1, or a time error caused when the power receiving apparatus 103-1 leaves the power transmission range 102.

If the power transmitting apparatus 101 determines that the new power receiving apparatus 103-N exists within the power transmission range 102 (YES in S304), it specifies the WPT method supported by the other power receiving apparatus 103-N (S305). A WPT method specifying method is not specifically limited. For example, the same method as the method of specifying the WPT method supported by the power receiving apparatus 103-1 can be used. If the power transmitting apparatus 101 determines that the power receiving apparatus 103-N supports a plurality of WPT methods among the first, second, and third WPT methods, it decides one of the WPT methods to be used for power transmission. After deciding the WPT method to be used for power transmission to the power receiving apparatus 103-N, the power transmitting apparatus 101 acquires predetermined information such as the requested power amount of the power receiving apparatus 103-N from the power receiving apparatus 103-N. This information is used to determine whether the power transmitting apparatus 101 changes the WPT method used for power transmission to the power receiving apparatus 103-1. If the power transmitting apparatus 101 acquires the predetermined information from the power receiving apparatus 103-N, the process advances to S306.

Based on the WPT method to be used for power transmission to the power receiving apparatus 103-N and the predetermined information acquired from the power receiving apparatus 103-N in S305, the power transmitting apparatus 101 determines whether to change the WPT method used for power transmission to the power receiving apparatus 103-1 (S306). A method of determining whether to change the WPT method will be described in detail later. If the power transmitting apparatus 101 determines to change the WPT method used for power transmission to the power receiving apparatus 103-1 (YES in S306), it decides a changed WPT method, and then negotiates with the power receiving apparatus 103-1 (S307). If the power transmitting apparatus 101 determines not to change the WPT method (NO in S306), the processing in S307 is not performed. After that, the power transmitting apparatus 101 negotiates with the power receiving apparatus 103-N(S308). Upon completion of the negotiation between the power transmitting apparatus 101 and the power receiving apparatus 103-N, the power transmitting apparatus 101 starts to transmit power to the power receiving apparatuses 103-1 and 103-N(S309).

Figure 4:
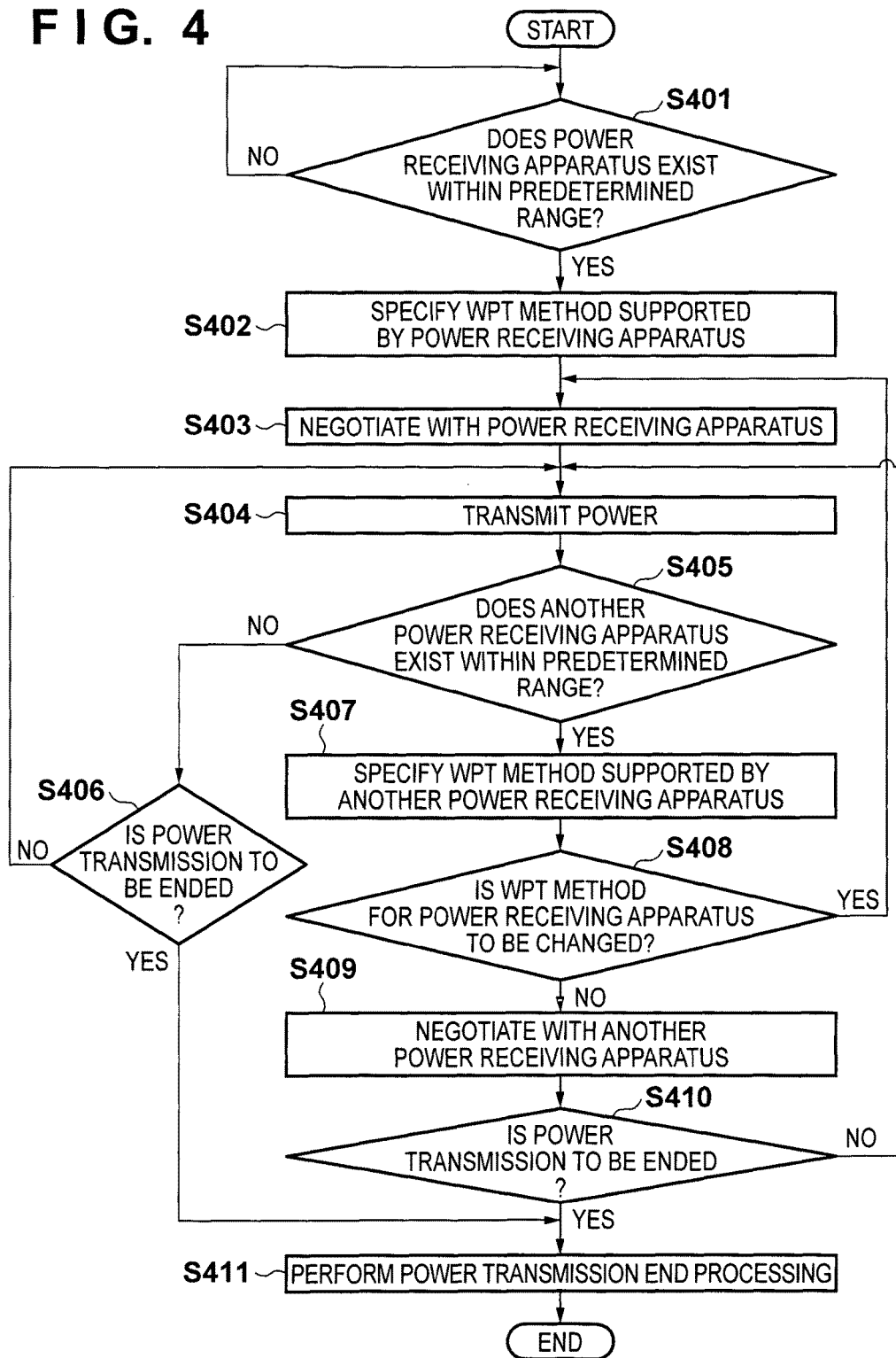
FIG. 4 is a flowchart for explaining the operation of the power transmitting apparatus 101 according to the first embodiment.

The operation of the power transmitting apparatus 101 according to this embodiment will be described with reference to FIG. 4. FIG. 4 is a flowchart for explaining the operation of the power transmitting apparatus 101 according to this embodiment. The power transmitting apparatus 101 of this embodiment implements the operation shown in FIG. 4 when a CPU (not shown) reads out a necessary program from a ROM, and executes it. Note that the power transmitting apparatus 101 of this embodiment is a power transmitting apparatus supporting the plurality of wireless power transmission methods (WPT methods). That is, while performing wireless power transmission to the power receiving apparatus 103 by the first WPT method, the power transmitting apparatus 101 can perform wireless power transmission to the power receiving apparatus 103 by the second WPT method, and transmit power to the power receiving apparatus 103 by the third WPT method. Upon power-on, the power transmitting apparatus 101 of this embodiment starts processing in step S401.

In step S401 of FIG. 4, the detection unit 209 of the power transmitting apparatus 101 detects the power receiving apparatus 103 (power receiving apparatus 103-1) existing within the power transmission range 102 (predetermined range). If the detection unit 209 determines that the new power receiving apparatus 103-1 exists within the power transmission range 102 (YES in step S401), the process advances to step S402. In step S402, the power transmission control unit 201 specifies the WPT method supported by the power receiving apparatus 103-1 detected in step S401. A WPT method specifying method is not limited. For example, there is provided a method of transmitting WPT-related signals (the above-described first, second, and third inquiry signals) from the communication unit 207 of the power transmitting apparatus 101 to the power receiving apparatus 103. Based on the presence/absence of responses to the WPT-related signals from the power receiving apparatus 103 and/or response contents, the power transmitting apparatus 101 can specify the WPT method supported by the power receiving apparatus 103. An example of the WPT-related signal is a connection request or ping signal defined by each of the first, second, and third WPT methods. Another example of the WPT-related signal is a message to inquire about the WPT method supported by the power receiving apparatus 103 (the above-described inquiry message). Upon receiving the message, the power receiving apparatus 103-1 transmits, as a response message, identification information of the WPT method supported by itself to the power transmitting apparatus 101.

Upon completion of specifying the WPT method supported by the power receiving apparatus 103-1, the process advances to step S403. In step S403, the power transmission control unit 201 negotiates with the power reception control unit 214 of the power receiving apparatus 103-1 about wireless power transmission. Note that if both the power transmitting apparatus 101 and the power receiving apparatus 103-1 support a plurality of WPT methods, the power transmission control unit 201 decides a WPT method to be used for power transmission to the power receiving apparatus 103-1 before executing a negotiation. A WPT method decision method is not specifically limited. As described above, for example, the power transmitting apparatus 101 can decide, as a WPT method to be used for power transmission to the power receiving apparatus 103-1, a WPT method by which it is possible to transmit power to a larger number of power receiving apparatuses at the same time. As another decision method, the power transmitting apparatus 101 can decide, as a WPT method to be used for power transmission to the power receiving apparatus 103-1, a WPT method by which a larger amount of power can be transmitted.

After deciding the WPT method to be used for power transmission to the power receiving apparatus 103-1, the power transmitting apparatus 101 negotiates with the power receiving apparatus 103-1 according to the decided WPT method. In the negotiation according to this embodiment, the power transmission control unit 201 acquires, from the power receiving apparatus 103-1, control information such as the charging status (0% to 100%), requested power amount (for example, 5 W), and current power consumption amount of the power receiving apparatus 103-1. Based on the acquired various kinds of information about the power receiving apparatus 103-1, the power transmission control unit 201 decides parameters such as a driving frequency and a current value or voltage value to be applied to the power transmitting antenna 206. Upon completion of the negotiation, the power transmitting unit 205 transmits power to the power receiving unit 211 (step S404: power transmitting procedure).

After the start of power transmission, the detection unit 209 of the power transmitting apparatus 101 determines whether the new power receiving apparatus 103 (power receiving apparatus 103-N) has been detected within the power transmission range 102. If the detection unit 209 has detected the power receiving apparatus 103-N within the power transmission range (predetermined range) (YES in step S405), the process advances to step S407; otherwise (NO in step S405), the process advances to step S406. In step S406, the power transmitting apparatus 101 determines whether to end power transmission to the power receiving apparatuses 103. If it is determined to end power transmission to all the power receiving apparatuses 103 (YES in step S406), the power transmission control unit 201 performs power transmission end processing in step S411, thereby terminating the processing shown in FIG. 4. If the power transmitting apparatus 101 determines to end power transmission to some of the power receiving apparatuses 103 (NO in step S406), it performs power transmission end processing to the power receiving apparatuses 103, and the process returns to step S404. A power transmission end condition includes, for example, various errors in the power transmitting apparatus 101, the full charge state of the power receiving apparatus 103, or a time error caused when the power receiving apparatus 103 leaves the power transmission range 102.

In step S407, the power transmission control unit 201 specifies the WPT method supported by the power receiving apparatus 103-N. A WPT method specifying method is not specifically limited. For example, the same method as the method of specifying the WPT method supported by the power receiving apparatus 103-1 can be used. If the power transmission control unit 201 determines that the power receiving apparatus 103-N supports a plurality of WPT methods among the first, second, and third WPT methods, it decides one of the WPT methods to be used for power transmission. After deciding the WPT method to be used for power transmission to the power receiving apparatus 103-N, the power transmission control unit 201 acquires predetermined information such as the requested power amount of the power receiving apparatus 103-N from the power receiving apparatus 103-N. This information is used to determine whether the power transmission control unit 201 changes the WPT method used for power transmission to the power receiving apparatus 103-1. If the power transmission control unit 201 acquires the predetermined information from the power receiving apparatus 103-N, the process advances to step S408.

Based on the WPT method to be used for power transmission to the power receiving apparatus 103-N and the predetermined information acquired from the power receiving apparatus 103-N in step S407, the power transmitting apparatus 101 determines whether to change the WPT method used for power transmission to the power receiving apparatus 103-1 (step S408). A method of determining whether to change the WPT method according to this embodiment will be described with reference to FIG. 9. FIG. 9 is a flowchart for explaining the processing (step S408) of determining whether to change the WPT method. As shown in Table 1, the power transmitting apparatus 101 can transmit a power of 5 W at maximum by the first WPT method, transmit a power of 20 W at maximum by the second WPT method, and transmit a power of 50 W at maximum by the third WPT method.

In step S901 of FIG. 9, the power transmission control unit 201 determines whether it is possible to transmit power to the power receiving apparatus 103-N newly detected in step S405. If it is possible to transmit power according to the requested power amount of the new power receiving apparatus 103-N without changing the WPT method (YES in step S901), it is determined not to change the WPT method (step S906), and the process advances to step S409 of FIG. 4. On the other hand, if it is impossible to transmit power to the new power receiving apparatus 103-N without changing the WPT method used for power transmission to the power receiving apparatus 103 in the power receiving state (NO in step S901), the process advances to step S902. The power receiving apparatus 103 in the power receiving state indicates a power receiving apparatus which has been detected by the power transmitting apparatus 101 before the power receiving apparatus 103-N is detected, and which is wirelessly receiving power from the power transmitting apparatus 101.

In step S902, the power transmission control unit 201 determines whether the power receiving apparatus 103 in the power receiving state supports a WPT method other than the WPT method currently used. If, for example, the power transmitting apparatus 101 is transmitting power to the power receiving apparatus 103-1 by the first WPT method, the power transmission control unit 201 determines whether the power receiving apparatus 103-1 supports the second and third WPT methods. If a plurality of power receiving apparatuses are in the power receiving state, the power transmission control unit 201 determines whether any of all the power receiving apparatuses 103 in the power receiving state supports the second and third WPT methods. If the power transmission control unit 201 determines that any of the power receiving apparatuses 103 in the power receiving state supports no WPT method other than the WPT method currently used (NO in step S902), it determines not to change the WPT method (step S906), and the process advances to step S409 of FIG. 4. On the other hand, if the power transmission control unit 201 determines that at least one of the power receiving apparatuses 103 in the power receiving state supports a WPT method other than the current WPT method (YES in step S902), the process advances to step S903.

In step S903, the power transmission control unit 201 determines whether it is possible to transmit power according to the requested power amount of the power receiving apparatus 103 even if the WPT method used for power transmission to the power receiving apparatus 103 in the power receiving state is changed. If, for example, the power transmitting apparatus 101 is transmitting a power of 5 W to the power receiving apparatus 103-1 by the first WPT method, the power transmission control unit 201 determines whether it is possible to transmit a power of 5 W to the power receiving apparatus 103-1 even if the WPT method is changed from the first WPT method to the second or third WPT method. Based on the number of apparatuses indicated by "enabling/disabling of power transmission to plural power receiving apparatuses" in Table 1 and the number of power receiving apparatuses 103 currently set as power transmission targets by the power transmitting apparatus 101, the power transmission control unit 201 determines whether it is possible to change the WPT method used for power transmission to each power receiving apparatus 103 in the power receiving state. If, for example, the power transmitting apparatus 101 is transmitting power to the one power receiving apparatus 103-1 (supporting the first and second WPT methods) by the first WPT method, and is transmitting power to three power receiving apparatuses 103-2, 103-3, 103-4 by the second WPT method, the power transmission control unit 201 determines as follows. That is, the power transmission control unit 201 determines that changing the WPT method used for power transmission to the power receiving apparatus 103-1 disables power transmission to the power receiving apparatus 103-1 according to the requested power amount. Note that if the WPT method can be changed to the third WPT method for at least one of the power receiving apparatuses 103-2, 103-3, and 103-4, the power transmission control unit 201 determines that even if the WPT method used for power transmission to the power receiving apparatus 103-1 is changed, it is possible to transmit power according to the requested power amount of the power receiving apparatus 103-1.

If the power transmission control unit 201 determines that changing the WPT method used for power transmission to the power receiving apparatus 103 in the power receiving state disables power transmission to the power receiving apparatus 103 according to the requested power amount (NO in step S903), it determines not to change the WPT method (step S906), and the process advances to step S409 of FIG. 4. On the other hand, if the power transmission control unit 201 determines that even if the WPT method used for power transmission to the power receiving apparatus 103 in the power receiving state is changed, it is possible to transmit power to the power receiving apparatus 103 according to the requested power amount (YES in step S903), the process advances to step S904. In step S904, the power transmission control unit 201 determines whether changing the WPT method used for power transmission to the power receiving apparatus 103 in the power receiving state allows power transmission according to the requested power amount of the new power receiving apparatus 103-N. If, for example, the power transmitting apparatus 101 is transmitting a power of 5 W to the power receiving apparatus 103-1 by the first WPT method, and the requested power amount of the new power receiving apparatus 103-N is 5 W, the power transmission control unit 201 determines that changing the WPT method allows power transmission to the new power receiving apparatus 103-N. On the other hand, if the requested power amount of the new power receiving apparatus 103-N is 10 W, the power transmission control unit 201 determines that it is impossible to transmit power according to the requested power amount of the new power receiving apparatus 103-N even if the WPT method is changed.

If the power transmission control unit 201 determines that it is impossible to transmit power according to the requested power amount of the new power receiving apparatus 103-N even if the WPT method used for power transmission to the power receiving apparatus 103 in the power receiving state is changed (NO in step S904), it determines not to change the WPT method (step S906), and the process advances to step S409 of FIG. 4. On the other hand, if the power transmission control unit 201 determines that changing the WPT method used for power transmission to the power receiving apparatus 103 in the power receiving state allows power transmission according to the requested power amount of the new power receiving apparatus 103-N (YES in step S904), the process advances to step S905. In step S905, the power transmission control unit 201 determines to change the WPT method used for power transmission to the power receiving apparatus 103 in the power receiving state, and the process advances to step S403 of FIG. 4.

According to the above-described determination method, the power transmission control unit 201 determines whether the amount of power transmissible by the first WPT method is exceeded when power is transmitted to the new power receiving apparatus 103-N by the first WPT method (first wireless power transmission method). In accordance with the result of the above determination processing, the power transmission control unit 201 changes the WPT method used for power transmission to the power receiving apparatus 103-1 from the first WPT method to the second WPT method. Note that a case in which the WPT method is changed from the first WPT method to the second WPT method has been explained above. The present invention, however, is not limited to this. For example, it is possible to change the WPT method from the second WPT method to the first WPT method or from the third WPT method to the second WPT method.

Referring back to FIG. 4, if the power transmitting apparatus 101 determines to change the WPT method used for power transmission to the power receiving apparatus 103-1 (YES in step S408), it decides a changed WPT method, and then negotiates with the power receiving apparatus 103-1 (step S403: control procedure). After the negotiation in step S403, if the power transmitting apparatus 101 restarts power transmission to the power receiving apparatus 103-1, it is determined in step S405 that the other power receiving apparatus 103-N exists, the process skips step S407, and a determination result in step S408 is "NO". Therefore, the power transmission control unit 201 of the power transmitting apparatus 101 negotiates with the power receiving apparatus 103-N (step S409). Upon completion of the negotiation between the power transmitting apparatus 101 and the power receiving apparatus 103-N, the power transmitting apparatus 101 determines whether to end power transmission (step S410). If, for example, the negotiation between the power transmitting apparatus 101 and the other power receiving apparatus 103-N has failed, a determination result in step S410 is "YES" and power transmission end processing is performed (step S411). If the power transmission control unit 201 determines not to end power transmission in step S410 (NO in step S410), power transmission to the power receiving apparatuses 103-1 and 103-N starts (step S404).

As described above, to change the WPT method used for power transmission to the power receiving apparatus 103-1, the power transmitting apparatus 101 of this embodiment starts a negotiation with the other power receiving apparatus 103-N after completion of the negotiation of the changed WPT method. With this operation, if changing of the WPT method used for power transmission to the power receiving apparatus 103-1 has failed, the power transmitting apparatus 101 can return the WPT method used for power transmission to the power receiving apparatus 103-1 to the WPT method before the change. Note that it is not always necessary to start a negotiation with the power receiving apparatus 103-N after completion of the negotiation of the changed WPT method. For example, upon receiving a predetermined signal (for example, an acknowledgement to a connection request) about control of the changed WPT method from the power receiving apparatus 103-1, the power transmission control unit 201 of the power transmitting apparatus 101 may start a negotiation with the power receiving apparatus 103-N. This can advance the start timing of power transmission to the power receiving apparatus 103-N.

For example, at a timing after the WPT method used for power transmission to the power receiving apparatus 103-1 is changed and before the power transmitting apparatus 101 receives a predetermined signal about control of the changed WPT method from the power receiving apparatus 103-1, power transmission to the power receiving apparatus 103-N may start. This can further advance the start timing of power transmission to the power receiving apparatus 103-N.

Assume that the power transmission control unit 201 of the power transmitting apparatus 101 of this embodiment changes the WPT method used for power transmission to the power receiving apparatus 103-1. In this case, upon completion of charging of the power receiving apparatus 103-N, the power transmission control unit 201 returns the WPT method used for power transmission to the power receiving apparatus 103-1 to the WPT method before the change. This makes it possible to transmit power by the WPT method initially selected as the WPT method used for power transmission to the power receiving apparatus 103-1. Note that the power transmission control unit 201 need not return the WPT method to that before the change. If the power transmission control unit 201 does not return the WPT method to that before the change, it is possible to reduce the load of changing the WPT method.

Figure 5:
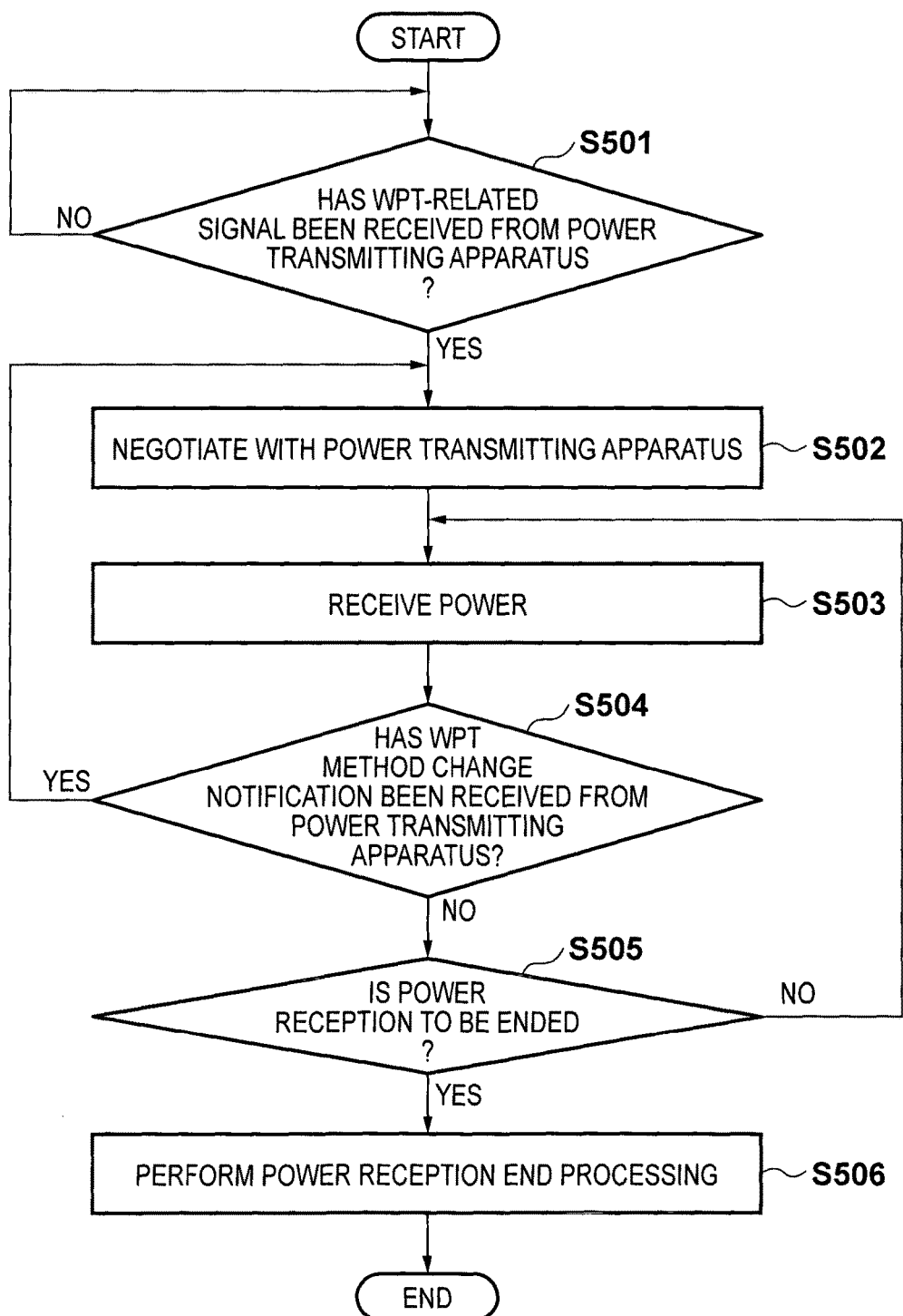
FIG. 5 is a flowchart for explaining the operation of the power receiving apparatus 103 according to the first embodiment.

The operation of the power receiving apparatus 103 according to this embodiment will be described with reference to FIG. 5. FIG. 5 is a flowchart for explaining the operation of the power receiving apparatus 103 according to this embodiment. The power receiving apparatus 103 of this embodiment implements the operation shown in FIG. 5 when a CPU (not shown) reads out a necessary program from a ROM, and executes it. Note that the power receiving apparatus 103 of this embodiment supports at least one of the first, second, and third WPT methods (wireless power transmission methods). That is, the power receiving apparatus 103 can receive power from the power transmitting apparatus 101 using at least one of the first, second, and third WPT methods. When the user sets a power receiving mode, the power receiving apparatus 103 of this embodiment starts the processing shown in FIG. 5. Note that upon power-on of the power receiving apparatus 103, the processing shown in FIG. 5 may start. The operation of the power receiving apparatus 103-1 when the first power receiving apparatus 103-1 enters the power transmission range 102 of the power transmitting apparatus 101 will be mainly explained below.

In step S501, the power reception control unit 214 of the power receiving apparatus 103-1 determines whether it has received a WPT-related signal from the power transmitting apparatus 101. The WPT-related signal is, for example, a connection request or ping signal defined by each of the first, second, and third WPT methods. The present invention, however, is not limited to them. For example, a message to inquire about the WPT method supported by the power receiving apparatus 103-1 may be used. The communication unit 213 of the power receiving apparatus 103-1 transmits a response to the WPT-related signal to the power transmitting apparatus 101 in accordance with the WPT method supported by itself.

If, for example, the power receiving apparatus 103-1 supports the first and second WPT methods, and does not support the third WPT method, it transmits not a response to the WPT-related signal of the third WPT method but responses to the WPT-related signals of the first and second WPT methods. Alternatively, the power receiving apparatus 103-1 transmits an error message to the power transmitting apparatus 101 as a response to the WPT-related signal of the third WPT method. If the power receiving apparatus 103-1 receives, as the WPT-related signal, a message to inquire about the supported WPT method, it transmits a response message including identification information of the WPT method supported by itself to the power transmitting apparatus 101. If the power receiving apparatus 103-1 supports the first and second WPT methods, a response message including identification information of the first and second WPT methods is transmitted to the power transmitting apparatus 101.

In step S502, the power reception control unit 214 negotiates with the power transmitting apparatus 101. In the negotiation according to this embodiment, the power transmitting apparatus 101 acquires, from the power receiving apparatus 103-1, control information such as the charging status (0% to 100%), requested power amount (for example, 5 W), and current power consumption amount of the power receiving apparatus 103-1. Based on the acquired various kinds of information about the power receiving apparatus 103-1, the power transmission control unit 201 of the power transmitting apparatus 101 decides parameters such as a driving frequency and a current value or voltage value to be applied to the power transmitting antenna 206. Upon completion of the negotiation, the power transmitting apparatus 101 starts to transmit power, and the power receiving apparatus 103-1 starts to receive the power (step S503).

After the start of power reception, the power reception control unit 214 determines whether a WPT method change notification has been received from the power transmitting apparatus 101 (step S504). The change notification includes identification information of the changed WPT method. The change notification may be a power transmission end signal defined by the WPT method before the change, and a power transmission start signal defined by the changed WPT method. If the communication unit 213 of the power receiving apparatus 103 has received a WPT method change notification (YES in step S504), the process returns to step S502, and the power reception control unit 214 negotiates with the power transmitting apparatus 101 to receive power by the changed WPT method. On the other hand, if the communication unit 213 has received no WPT method change notification (NO in step S504), the process advances to step S505.

In step S505, the power reception control unit 214 determines whether to end power reception. A power reception end determination condition includes, for example, various errors or a full charge state on the side of the power receiving apparatus 103-1, or reception of a power transmission end signal from the power transmitting apparatus 101. If the power reception control unit 214 determines to end power reception in step S505 (YES in step S505), the process advances to step S506 to perform power reception end processing, thereby terminating the processing shown in FIG. 5. If the power reception control unit 214 determines not to end power reception in step S505 (NO in step S505), the process returns to step S503 to continue power reception.

As described above, the power transmitting apparatus 101 of this embodiment changes the WPT method used for power transmission to the power receiving apparatus 103-1 detected by the detection unit 209 in accordance with a WPT method supported by the power receiving apparatus 103-2 detected after the power receiving apparatus 103-1. This can improve the efficiency of wireless power transmission in a system supporting a plurality of wireless power transmission methods (WPT methods).

Note that in the aforementioned embodiment, a case in which the WPT method used for power transmission to the power receiving apparatus 103-1 is changed so that the WPT method used for power transmission to the power receiving apparatus 103-1 is different from that used for power transmission to the power receiving apparatus 103-N has been mainly described. The present invention, however, is not limited to this. That is, the power transmission control unit 201 of the power transmitting apparatus 101 can change the WPT method used for power transmission to the power receiving apparatus 103-1 so that the WPT method used for power transmission to the power receiving apparatus 103-1 is the same as that used for power transmission to the power receiving apparatus 103-N.

For example, there can be a case in which while the power transmitting apparatus 101 transmits power to the power receiving apparatus 103-1 by the first WPT method, it is determined that the power receiving apparatus 103-N which supports not the first WPT method but the second WPT method exists within the power transmission range 102 of the power transmitting apparatus 101. In this case, the power transmission control unit 201 of the power transmitting apparatus 101 changes the WPT method used for power transmission to the power receiving apparatus 103-1 from the first WPT method to the second WPT method. This can unify the WPT methods used for power transmission to the power receiving apparatuses 103-1 and 103-N to the second WPT method, thereby implementing high efficiency wireless power transmission.

<Second Embodiment>

The second embodiment of the present invention will be described by mainly focusing attention on the difference from the first embodiment. In this embodiment, a power receiving apparatus 103 in the power receiving state controls to change a WPT method used for power reception in accordance with a WPT method (wireless power transmission method) supported by a newly detected power receiving apparatus 103-N.

Figure 6:
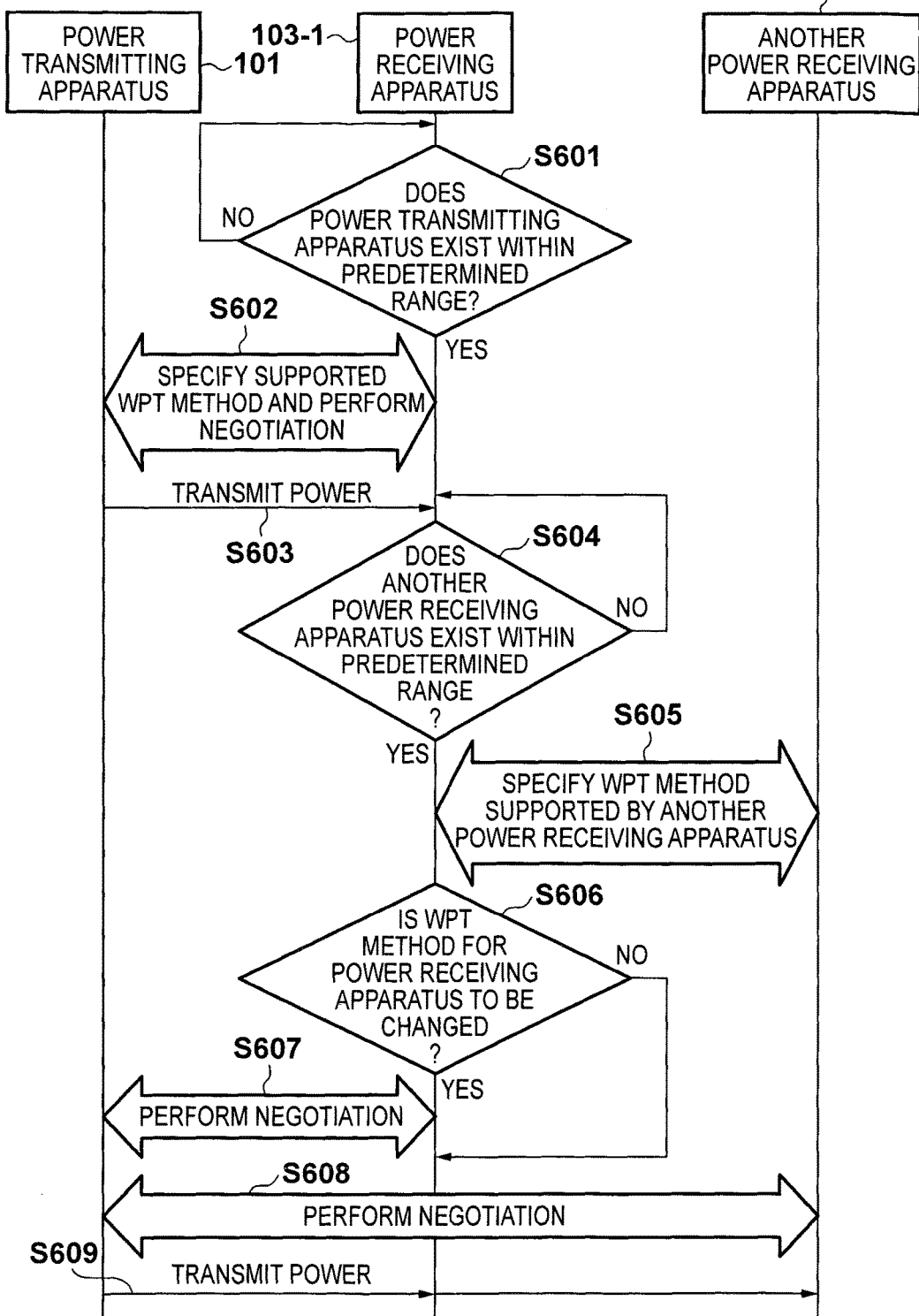
FIG. 6 is a sequence chart for explaining the operation of a power transmitting apparatus 101 and power receiving apparatuses 103 according to the second embodiment.

The operation of a power transmitting apparatus 101 and the power receiving apparatus 103 according to this embodiment will be described with reference to a sequence chart shown in FIG. 6. FIG. 6 is a sequence chart for explaining the operation of the power transmitting apparatus 101 and power receiving apparatus 103 according to this embodiment. In S601 of FIG. 6, a power receiving apparatus 103-1 determines whether it exists within a power transmission range 102 (predetermined range) of the power transmitting apparatus 101. If the power receiving apparatus 103-1 determines to be within the power transmission range of the power transmitting apparatus 101 (YES in S601), it negotiates with the power transmitting apparatus 101 while specifying a WPT method supported by the power transmitting apparatus 101 (S602). A WPT method specifying method is not specifically limited. For example, the power receiving apparatus 103-1 can transmit inquiry signals for respective WPT methods supported by itself to the power transmitting apparatus 101. The power receiving apparatus 103-1 can specify the WPT method supported by the power transmitting apparatus 101 based on responses to the inquiry signals from the power transmitting apparatus 101. As another method of specifying the WPT method supported by the power transmitting apparatus 101, for example, the power receiving apparatus 103-1 transmits an inquiry message. Upon receiving the inquiry message, the power transmitting apparatus 101 transmits identification information of the WPT method supported by itself. With this processing, the power receiving apparatus 103-1 can also specify the WPT method supported by the power transmitting apparatus 101.

If the power receiving apparatus 103-1 determines that the power transmitting apparatus 101 also supports a plurality of WPT methods among the WPT methods supported by the power receiving apparatus 103-1 itself, it decides one of the WPT methods to be used for power transmission. A WPT method decision method is not specifically limited. For example, the power receiving apparatus 103-1 can decide, as a WPT method to be used for power transmission to the power receiving apparatus 103-1, a WPT method by which it is possible to transmit power to a larger number of power receiving apparatuses at the same time. According to the above decision method, when both the power transmitting apparatus 101 and the power receiving apparatus 103-1 support the first and second WPT methods, the power transmitting apparatus 101 transmits power to the power receiving apparatus 103-1 by the second WPT method. Note that the present invention is not limited to this, if the second WPT method is already used for power transmission to another power receiving apparatus 103-X.

As another decision method, the power receiving apparatus 103-1 can decide, as a WPT method to be used for power transmission to the power receiving apparatus 103-1, a WPT method by which a larger amount of power can be transmitted. According to the above decision method, when both the power transmitting apparatus 101 and the power receiving apparatus 103-1 support the first and second WPT methods, the power transmitting apparatus 101 transmits power to the power receiving apparatus 103-1 by the second WPT method. Note that the present invention is not limited to this, if the second WPT method is already used for power transmission to the other power receiving apparatus 103-X.

After deciding the WPT method to be used for power transmission from the power transmitting apparatus 101 to the power receiving apparatus 103-1, the power receiving apparatus 103-1 negotiates with the power transmitting apparatus 101 according to the decided WPT method. In the negotiation according to this embodiment, the power transmitting apparatus 101 acquires, from the power receiving apparatus 103-1, control information such as the charging status (0% to 100%), requested power amount (for example, 5 W), and current power consumption amount of the power receiving apparatus 103-1. Based on the acquired various kinds of information about the power receiving apparatus 103-1, the power transmitting apparatus 101 decides parameters such as a driving frequency and a current value or voltage value to be applied to a power transmitting antenna 206. Upon completion of the negotiation, the power transmitting apparatus 101 transmits power to the power receiving apparatus 103-1 (S603).

After the start of power transmission, the power receiving apparatus 103-1 determines whether the power receiving apparatus 103-N exists within the power transmission range 102 (predetermined range) of the power transmitting apparatus 101 (S604). If the power receiving apparatus 103-1 determines that no other power receiving apparatus 103-N exists (NO in S604), it determines whether to end power reception. If the power receiving apparatus 103-1 determines to end power reception, it performs power reception end processing. On the other hand, if the power receiving apparatus 103-1 determines not to end power reception, it continues power reception from the power transmitting apparatus 101. A power reception end determination condition includes, for example, various errors in the power receiving apparatus 103-1, the full charge state of the power receiving apparatus 103-1, or a time error caused when the power receiving apparatus 103-1 leaves the power transmission range 102.

If the power receiving apparatus 103-1 determines that the other power receiving apparatus 103-N exists within the power transmission range 102 of the power transmitting apparatus 101 (YES in S604), it specifies a WPT method supported by the other power receiving apparatus 103-N (S605). A WPT method specifying method is not specifically limited. There is provided a method of transmitting inquiry signals for the plurality of WPT methods, and specifying the supported WPT method based on a response from the other power receiving apparatus 103-N. Furthermore, as another WPT method specifying method, the power transmitting apparatus 101 transmits an inquiry message to inquire about a WPT method supporting status to the power receiving apparatus 103-N, and the supported WPT method is specified based on a response from the power receiving apparatus 103-N. The present invention, however, is not limited to them.

If the power receiving apparatus 103-1 determines that the power receiving apparatus 103-N supports a plurality of WPT methods among the first, second, and third WPT methods supported by the power transmitting apparatus 101, it decides one of the WPT methods to be used for power transmission to the power receiving apparatus 103-N. After deciding the WPT method to be used for power transmission to the power receiving apparatus 103-N, the power receiving apparatus 103-1 acquires predetermined information such as the requested power amount of the power receiving apparatus 103-N from the power receiving apparatus 103-N. This information is used to determine whether the power transmitting apparatus 101 changes the WPT method used for power transmission to the power receiving apparatus 103-1. If the power receiving apparatus 103-1 acquires the predetermined information from the power receiving apparatus 103-N, the process advances to S606.

Based on the WPT method to be used for power transmission to the power receiving apparatus 103-N and the predetermined information acquired from the power receiving apparatus 103-N in S605, the power receiving apparatus 103-1 determines whether to change the WPT method used for power transmission to the power receiving apparatus 103-1 (S606). A method of determining whether to change the WPT method will be described in detail later. If the power receiving apparatus 103-1 determines to change the WPT method used for power transmission to the power receiving apparatus 103-1 (YES in S606), it decides a changed WPT method, and then negotiates with the power transmitting apparatus 101 (S607). If the power receiving apparatus 103-1 determines not to change the WPT method (NO in S606), the processing in S607 is not performed. After that, a negotiation between the power transmitting apparatus 101 and the power receiving apparatus 103-N is performed (S608). Upon completion of the negotiation between the power transmitting apparatus 101 and the power receiving apparatus 103-N, the power transmitting apparatus 101 starts to transmit power to the power receiving apparatuses 103-1 and 103-N(S609).

The operation of the power transmitting apparatus 101 according to this embodiment will be described with reference to FIG. 7. FIG. 7 is a flowchart for explaining the operation of the power transmitting apparatus 101 according to this embodiment. The power transmitting apparatus 101 of this embodiment implements the operation shown in FIG. 7 when a CPU (not shown) reads out a necessary program from a ROM, and executes it. Note that the power transmitting apparatus 101 of this embodiment is a power transmitting apparatus supporting a plurality of wireless power transmission methods (WPT methods). That is, while performing wireless power transmission to the power receiving apparatus 103 by the first WPT method, the power transmitting apparatus 101 can perform wireless power transmission to the power receiving apparatus 103 by the second WPT method, and transmit power to the power receiving apparatus 103 by the third WPT method. Upon power-on, the power transmitting apparatus 101 of this embodiment starts processing in step S701.

In step S701, a power transmission control unit 201 of the power transmitting apparatus 101 determines whether a WPT-related signal has been received from the power receiving apparatus 103. The WPT-related signal is, for example, a connection request or ping signal defined by each of the first, second, and third WPT methods. Alternatively, the WPT-related signal is a message to inquire about the WPT methods supported by the power transmitting apparatus 101. A communication unit 207 of the power transmitting apparatus 101 transmits a response to the WPT-related signal to the power receiving apparatus 103-1 in accordance with the WPT methods supported by itself. If, for example, the power receiving apparatus 103-1 supports the first and second WPT methods, connection requests for the first and second WPT methods are transmitted. The power transmitting apparatus 101 transmits, to the power receiving apparatus 103-1, responses to the connection requests for the first and second WPT methods. If a message to inquire about the WPT method supporting status is received as a WPT-related signal (YES in step S701), the power transmitting apparatus 101 transmits a response including identification information of the WPT methods (first, second, and third WPT methods) supported by itself to the power receiving apparatus 103-1.

In step S702, the power transmission control unit 201 negotiates with the power receiving apparatus 103-1. In the negotiation according to this embodiment, the power transmitting apparatus 101 acquires, from the power receiving apparatus 103-1, control information such as the charging status (0% to 100%), requested power amount (for example, 5 W), and current power consumption amount of the power receiving apparatus 103-1. Based on the acquired various kinds of information about the power receiving apparatus 103-1, the power transmission control unit 201 of the power transmitting apparatus 101 decides parameters such as a driving frequency and a current value or voltage value to be applied to the power transmitting antenna 206. Upon completion of the negotiation, the power transmitting apparatus 101 starts to transmit power, and the power receiving apparatus 103-1 receives the power (step S703).

After the start of power transmission to the power receiving apparatus 103-1, the power transmission control unit 201 determines whether a WPT-related signal has been received from the other power receiving apparatus 103-N (step S704). The WPT-related signal in this embodiment is a connection request or ping signal defined by each of the first, second, and third WPT methods, as described in step S701. For example, the WPT-related signal is a message to inquire about the WPT methods supported by the power transmitting apparatus 101. If the power transmission control unit 201 determines in step S704 that no WPT-related signal has been received from the power receiving apparatus 103-N (NO in step S704), the process advances to step S705. Alternatively, if the power transmission control unit 201 determines that a WPT-related signal has been received from the power receiving apparatus 103-N (YES in step S704), the process returns to step S702. In step S702, the power transmission control unit 201 negotiates with the power receiving apparatus 103-N, similarly to the case of the power receiving apparatus 103-1. If the negotiation succeeds, the power transmission control unit 201 starts to transmit power to the power receiving apparatus 103-N.

In step S705, the power transmission control unit 201 determines whether a WPT method change notification has been received from the power receiving apparatus 103-1. The change notification includes identification information of the changed WPT method. The change notification may be a power transmission end signal defined by the WPT method before the change, and a power transmission start signal defined by the changed WPT method. If the communication unit 207 of the power transmitting apparatus 101 receives a WPT method change notification (YES in step S705), the process returns to step S702, and the power transmission control unit 201 negotiates with the power receiving apparatus 103-1 to transmit power by the changed WPT method. On the other hand, if the communication unit 207 receives no WPT method change notification (NO in step S705), the process advances to step S706.

In step S706, the power transmission control unit 201 determines whether to end power transmission. A power transmission end determination condition includes, for example, various errors on the side of the power transmitting apparatus 101, or reception of a power reception end signal from the power receiving apparatus 103. If the power transmission control unit 201 determines to end power transmission in step S706 (YES in step S706), the process advances to step S707 to perform power transmission end processing, thereby terminating the processing shown in FIG. 7. If the power transmission control unit 201 determines not to end power transmission in step S706 (NO in step S706), the process returns to step S703 to continue power transmission.

The operation of the power receiving apparatus 103 according to this embodiment will be described with reference to FIG. 8. FIG. 8 is a flowchart for explaining the operation of the power receiving apparatus 103 according to this embodiment. The power receiving apparatus 103 of this embodiment implements the operation shown in FIG. 8 when a CPU (not shown) reads out a necessary program from a ROM, and executes it. Note that the power receiving apparatus 103 of this embodiment supports at least one of the first, second, and third WPT methods (wireless power transmission methods). That is, the power receiving apparatus 103 can receive power from the power transmitting apparatus 101 using at least one of the first, second, and third WPT methods. When the user sets the power receiving mode, the power receiving apparatus 103 of this embodiment starts the processing shown in FIG. 8. Note that upon power-on of the power receiving apparatus 103, the processing shown in FIG. 8 may start. The operation of the power receiving apparatus 103-1 when the first power receiving apparatus 103-1 enters the power transmission range 102 of the power transmitting apparatus 101 will be mainly explained below.

In step S801 of FIG. 8, a detection unit 218 of the power receiving apparatus 103-1 determines whether the power receiving apparatus 103-1 exists within the power transmission range 102 (predetermined range) of the power transmitting apparatus 101. If the detection unit 218 determines that the power receiving apparatus 103-1 exists within the power transmission range 102 (YES in step S801), the process advances to step S802. In step S802, the power reception control unit 214 specifies the WPT methods supported by the power transmitting apparatus 101. A WPT method specifying method is not limited. For example, there is provided a method of transmitting WPT-related signals from a communication unit 213 of the power receiving apparatus 103-1 to the power transmitting apparatus 101. Based on the presence/absence of responses to the WPT-related signals from the power transmitting apparatus 101 and/or response contents, the power receiving apparatus 103-1 can specify the WPT methods supported by the power receiving apparatus 101.

An example of the WPT-related signal is a connection request or ping signal defined by each of the first, second, and third WPT methods. Another example of the WPT-related signal is a message to inquire about the WPT methods supported by the power transmitting apparatus 101. Upon receiving the message, the power transmitting apparatus 101 transmits, as a response message, identification information of the WPT methods supported by itself to the power receiving apparatus 103-1. Upon completion of specifying the WPT methods supported by the power transmitting apparatus 101, the process advances to step S803.

In step S803, a power reception control unit 214 negotiates with the power transmission control unit 201 of the power transmitting apparatus 101 about wireless power transmission. Note that if both the power transmitting apparatus 101 and the power receiving apparatus 103-1 support a plurality of WPT methods, the power reception control unit 214 decides one of the WPT methods to be used for power transmission to the power receiving apparatus 103-1 before executing a negotiation. A WPT method decision method is not specifically limited. As described above, for example, the power reception control unit 214 can decide, as a WPT method to be used for power transmission to the power receiving apparatus 103-1, a WPT method by which it is possible to transmit power to a larger number of power receiving apparatuses at the same time. As another decision method, the power reception control unit 214 can decide, as a WPT method to be used for power transmission to the power receiving apparatus 103-1, a WPT method by which a larger amount of power can be transmitted.

After deciding the WPT method to be used for power transmission to the power receiving apparatus 103-1, the power reception control unit 214 negotiates with the power transmitting apparatus 101 according to the decided WPT method. In the negotiation according to this embodiment, the power transmission control unit 201 acquires, from the power receiving apparatus 103-1, control information such as the charging status (0% to 100%), requested power amount (for example, 5 W), and current power consumption amount of the power receiving apparatus 103-1. Based on the acquired various kinds of information about the power receiving apparatus 103-1, the power transmission control unit 201 decides parameters such as a driving frequency and a current value or voltage value to be applied to the power transmitting antenna 206. Upon completion of the negotiation, a power transmitting unit 205 starts to transmit power, and the power receiving unit 211 of the power receiving apparatus 103-1 receives the power (step S804: power receiving procedure).

After the start of power reception, the detection unit 218 of the power receiving apparatus 103-1 determines whether a new power receiving apparatus (power receiving apparatus 103-N) has been detected within the power transmission range 102 of the power transmitting apparatus 101 (step S805: detection procedure). If the detection unit 218 has detected the new power receiving apparatus 103-N(YES in step S805), the process advances to step S807; otherwise (NO in step S805), the process advances to step S806. In step S806, the power reception control unit 214 of the power receiving apparatus 103-1 determines whether to end power reception from the power transmitting apparatus 101. If the power reception control unit 214 determines to end power reception from the power transmitting apparatus 101 (YES in step S806), it performs power reception end processing in step S810, thereby terminating the processing shown in FIG. 8. A power reception end condition includes, for example, various errors in the power receiving apparatus 103-1, the full charge state of the power receiving apparatus 103-1, or an operation in which the power receiving apparatus 103-1 leaves the power transmission range 102.

In step S807, the power reception control unit 214 specifies a WPT method supported by the power receiving apparatus 103-N. A WPT method specifying method is not specifically limited. For example, there is provided a method of transmitting WPT-related signals from the communication unit 213 of the power receiving apparatus 103-1 to the power receiving apparatus 103-N. Based on the presence/ absence of responses to the WPT-related signals from the power receiving apparatus 103-N and/or response contents, the power reception control unit 214 of the power receiving apparatus 103-1 can specify the WPT method supported by the power receiving apparatus 103-N. If the power reception control unit 214 determines that the power transmitting apparatus 101 supports a plurality of WPT methods among the WPT methods supported by the power receiving apparatus 103-N, it decides one of the WPT methods to be used by the power transmitting apparatus 101 for power transmission. After deciding the WPT method to be used for power reception from the power transmitting apparatus 101, the power reception control unit 214 of the power receiving apparatus 103-1 acquires predetermined information such as the requested power amount of the power receiving apparatus 103-N from the power receiving apparatus 103-N. This information is used to determine whether the power reception control unit 214 changes the WPT method used for power transmission to the power receiving apparatus 103-1. If the power reception control unit 214 acquires the predetermined information from the power receiving apparatus 103-N, the process advances to step S808.

In step S808, based on the WPT method to be used for power transmission to the power receiving apparatus 103-N and the predetermined information acquired from the power receiving apparatus 103-N in step S807, the power reception control unit 214 of the power receiving apparatus 103-1 determines whether to change the WPT method used for power transmission to the power receiving apparatus 103-1. A method of determining whether to change the WPT method according to this embodiment will be described with reference to FIG. 9. FIG. 9 is a flowchart for explaining the processing (step S808) of determining whether to change the WPT method. As shown in Table 1, the power transmitting apparatus 101 can transmit a power of 5 W at maximum by the first WPT method, transmit a power of 20 W at maximum by the second WPT method, and transmit a power of 50 W at maximum by the third WPT method.

In step S901 of FIG. 9, the power reception control unit 214 determines whether the power transmitting apparatus 101 can transmit power to the power receiving apparatus 103-N newly detected in step S805. If the power transmitting apparatus 101 can transmit power according to the requested power amount of the new power receiving apparatus 103-N without changing the WPT method (YES in step S901), it is determined not to change the WPT method (step S906), and the process advances to step S809 of FIG. 8. On the other hand, if the power transmitting apparatus 101 cannot transmit power to the new power receiving apparatus 103-N without changing the WPT method used for power transmission to the power receiving apparatus 103 in the power receiving state (NO in step S901), the process advances to step S902. This determination processing is performed based on whether the number of power receiving apparatuses to which it is possible to transmit power by the first WPT method is exceeded when power is transmitted to the power receiving apparatus 103-N by the first WPT method. Alternatively, this determination processing is performed based on whether an amount of power transmissible by the first WPT method is exceeded when power is transmitted to the power receiving apparatus 103-N by the first WPT method. Note that the power receiving apparatus 103 in the power receiving state indicates one or a plurality of power receiving apparatuses which have been detected by the power transmitting apparatus 101 before the power receiving apparatus 103-N is detected, and which are wirelessly receiving power from the power transmitting apparatus 101. The power receiving apparatus 103-1 is included in the power receiving apparatus 103 in the power receiving state.

In step S902, the power reception control unit 214 determines whether the power transmitting apparatus 101 supports a WPT method other than the WPT method currently used. If, for example, the power transmitting apparatus 101 is transmitting power to the power receiving apparatus 103-1 by the first WPT method, the power reception control unit 214 of the power receiving apparatus 103-1 determines whether the power transmitting apparatus 101 supports another WPT method. If the power reception control unit 214 determines that the power transmitting apparatus 101 supports no WPT method other than the WPT method currently used (NO in step S902), it determines not to change the WPT method (step S906), and the process advances to step S809 of FIG. 8. On the other hand, if the power reception control unit 214 determines that the power transmitting apparatus 101 supports another WPT method (YES in step S902), the process advances to step S903.

In step S903, the power reception control unit 214 of the power receiving apparatus 103-1 determines whether the power transmitting apparatus 101 can transmit power according to the requested power amount of the power receiving apparatus 103 even if the WPT method used for power transmission to the power receiving apparatus 103 in the power receiving state is changed. If, for example, the power transmitting apparatus 101 is transmitting a power of 5 W to the power receiving apparatus 103-1 by the first WPT method, the power reception control unit 214 determines whether it is possible to transmit a power of 5 W to the power receiving apparatus 103-1 even if the WPT method is changed from the first WPT method to the second or third WPT method.

Based on the number of apparatuses indicated by "enabling/disabling of power transmission to plural power receiving apparatuses" in Table 1 and the number of power receiving apparatuses 103 currently set as power transmission targets by the power transmitting apparatus 101, the power reception control unit 214 determines whether it is possible to change the WPT method used for power transmission to each power receiving apparatus 103 in the power receiving state. If, for example, the power transmitting apparatus 101 is transmitting power to the one power receiving apparatus 103-1 (supporting the first and second WPT methods) by the first WPT method, and is transmitting power to three power receiving apparatuses 103-2, 103-3, 103-4 by the second WPT method, the power reception control unit 214 determines as follows. That is, the power reception control unit 214 determines that changing the WPT method used for power transmission to the power receiving apparatus 103-1 disables power transmission to the power receiving apparatus 103-1 according to the requested power amount. Note that the WPT method can be changed to the third WPT method for at least one of the power receiving apparatuses 103-2, 103-3, and 103-4. In this case, the power reception control unit 214 of the power receiving apparatus 103-1 determines that even if the WPT method used for power transmission to the power receiving apparatus 103-1 is changed, it is possible to transmit power according to the requested power amount of the power receiving apparatus 103-1.

If the power reception control unit 214 determines that changing the WPT method used for power transmission to the power receiving apparatus 103 in the power receiving state disables power transmission to the power receiving apparatus 103 according to the requested power amount (NO in step S903), it determines not to change the WPT method (step S906), and the process advances to step S809 of FIG. 8. On the other hand, if the power reception control unit 214 determines that even if the WPT method used for power transmission to the power receiving apparatus 103 in the power receiving state is changed, it is possible to transmit power to the power receiving apparatus 103 according to the requested power amount (YES in step S903), the process advances to step S904. In step S904, the power reception control unit 214 determines whether changing the WPT method used for power transmission to the power receiving apparatus 103 in the power receiving state enables the power transmitting apparatus 101 to transmit power according to the requested power amount of the new power receiving apparatus 103-N. If, for example, the power transmitting apparatus 101 is transmitting a power of 5 W to the power receiving apparatus 103-1 by the first WPT method, and the requested power amount of the new power receiving apparatus 103-N is 5 W, the power reception control unit 214 determines that changing the WPT method allows power transmission to the new power receiving apparatus 103-N. On the other hand, if the requested power amount of the new power receiving apparatus 103-N is 10 W, the power reception control unit 214 determines that it is impossible to transmit power according to the requested power amount of the new power receiving apparatus 103-N even if the WPT method is changed.

If the power reception control unit 214 determines that it is impossible to transmit power according to the requested power amount of the new power receiving apparatus 103-N even if the WPT method used for power transmission to the power receiving apparatus 103 in the power receiving state is changed (NO in step S904), it determines not to change the WPT method (step S906), and the process advances to step S809 of FIG. 8. On the other hand, if the power reception control unit 214 determines that changing the WPT method used for power transmission to the power receiving apparatus 103 in the power receiving state allows power transmission according to the requested power amount of the new power receiving apparatus 103-N (YES in step S904), the process advances to step S905. In step S905, the power reception control unit 214 determines to change the WPT method used for power transmission to the power receiving apparatus 103 in the power receiving state, and the process advances to step S803 of FIG. 8.

According to the above-described determination method, the power reception control unit 214 of the power receiving apparatus 103-1 determines whether the amount of power transmissible by the first WPT method is exceeded when the power transmitting apparatus 101 transmits power to the new power receiving apparatus 103-N by the first WPT method. Furthermore, the power reception control unit 214 determines whether the number of power receiving apparatuses to which the power transmitting apparatus 101 can transmit power by the first WPT method is exceeded when the power transmitting apparatus 101 transmits power to the power receiving apparatus 103-N by the first WPT method. In accordance with the result of the above determination processing, the power reception control unit 214 changes the WPT method used for power transmission to the power receiving apparatus 103-1 (first power receiving apparatus) from the first WPT method to the second WPT method. Note that a case in which the WPT method is changed from the first WPT method to the second WPT method has been explained above. The present invention, however, is not limited to this. For example, it is possible to change the WPT method from the second WPT method to the first WPT method or from the third WPT method to the second WPT method.

Referring back to FIG. 8, if the power reception control unit 214 of the power receiving apparatus 103-1 determines not to change the WPT method in step S808 (NO in step S808), it determines whether to end power reception (step S809). If the power reception control unit 214 determines not to end power reception (NO in step S809), it continues the power receiving processing (step S804). On the other hand, if the power reception control unit 214 determines to end power reception (YES in step S809), the process advances to step S810 to perform power reception end processing, thereby terminating the processing shown in FIG. 8.

As described above, the power receiving apparatus 103 of this embodiment changes the WPT method used for power transmission to itself in accordance with the WPT method supported by the power receiving apparatus 103-N detected after the power receiving apparatus 103 itself. This can improve the efficiency of wireless power transmission in a system supporting a plurality of wireless power transmission methods (WPT methods).

Note that in the aforementioned embodiment, a case in which the WPT method used for power transmission to the power receiving apparatus 103-1 is changed so that the WPT method used for power transmission to the power receiving apparatus 103-1 is different from that used for power transmission to the power receiving apparatus 103-N has been mainly described. The present invention, however, is not limited to this. That is, the power reception control unit 214 of the power receiving apparatus 103-1 can change the WPT method used for power transmission to the power receiving apparatus 103-1 so that the WPT method used for power transmission to the power receiving apparatus 103-1 is the same as that used for power transmission to the power receiving apparatus 103-N.

For example, there can be a case in which while the power receiving apparatus 103-1 receives power from the power transmitting apparatus 101 by the first WPT method, it is determined that the power receiving apparatus 103-N which supports not the first WPT method but the second WPT method exists within the power transmission range 102 of the power transmitting apparatus 101. In this case, the power reception control unit 214 of the power receiving apparatus 103-1 changes the WPT method used for power transmission to the power receiving apparatus 103-1 from the first WPT method to the second WPT method. This can unify the WPT methods used for power transmission to the power receiving apparatuses 103-1 and 103-N to the second WPT method, thereby implementing high efficiency wireless power transmission.

<Third Embodiment>

In the first and second embodiments, the power transmitting apparatus 101 or the power receiving apparatus 103 uses the detection unit 209 of the power transmitting apparatus 101 or the detection unit 218 of the power receiving apparatus 103 to determine whether the power receiving apparatus 103 exists within the power transmission range 102 of the power transmitting apparatus 101. However, both a power transmitting apparatus 101 and a power receiving apparatus 103 may determine whether the power receiving apparatus 103 exists within a power transmission range 102 of the power transmitting apparatus 101. That is, only if both the determination results of the power transmitting apparatus 101 and power receiving apparatus 103 indicate that the power receiving apparatus 103 exists, it is finally determined that the power receiving apparatus 103 exists. In this case, it is possible to improve the accuracy and reliability in terms of detection of the power receiving apparatus 103 by the power transmitting apparatus 101 and detection of the power transmitting apparatus 101 by the power receiving apparatus 103.

By comparing the first and second embodiments, it is found that processing in which the power transmitting apparatus 101 specifies the WPT method of the power receiving apparatus 103 starts in the first embodiment. In the second embodiment, processing in which the power receiving apparatus 103 specifies the WPT method of the power receiving apparatus 103 starts. To the contrary, in this embodiment, either the power transmitting apparatus 101 or the power receiving apparatus 103 may specify the WPT method. That is, either the power transmitting apparatus 101 or the power receiving apparatus 103 may start processing of specifying the WPT method and performing a negotiation between the power transmitting apparatus 101 and the power receiving apparatus 103 (S302 of FIG. 3 or S602 of FIG. 6).

Furthermore, in the first embodiment, the power transmitting apparatus 101 specifies the WPT method of another power receiving apparatus 103. In the second embodiment, the power receiving apparatus 103 specifies the WPT method of another power receiving apparatus 103. To the contrary, in this embodiment, either the power transmitting apparatus 101 or the power receiving apparatus 103 may specify the WPT method of another power receiving apparatus 103. That is, either the power transmitting apparatus 101 or the power receiving apparatus 103 may specify the WPT method between the power transmitting apparatus 101 and another power receiving apparatus 103 (S305 of FIG. 3) or specify the WPT method between the power receiving apparatus 103 and another power receiving apparatus 103 (S605 of FIG. 6).

<Fourth Embodiment>

In the first and second embodiments, a WPT method for power transmission is decided by a predetermined decision method regardless of the user's intention of the power receiving apparatus 103 or another power receiving apparatus 103. The user may directly set a desired WPT method using a UI (User Interface) 215 of a power receiving apparatus 103 to notify a power transmitting apparatus 101 of the set WPT method. In this case, if it is impossible to transmit power by the notified WPT method, it is only necessary to display it on the UI (User Interface) 215. Similarly, the user may directly set a desired WPT method using a UI (User Interface) 215 of another power receiving apparatus 103 to notify the power transmitting apparatus 101 or the power receiving apparatus 103 of the set WPT method. In this case, if it is impossible to transmit power by the notified WPT method, it is only necessary to display it on the UI (User Interface) 215 of the other power receiving apparatus 103.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-205354, filed Sep. 30, 2013 which is hereby incorporated by reference herein in its entirety.

The invention claimed is:

1. A power transmitting apparatus comprising:
   a first power transmitting unit configured to transmit power by a first wireless power transmission method;
   a second power transmitting unit configured to transmit power by a second wireless power transmission method;
   a detection unit configured to detect a wireless power transmission method supported by a power receiving apparatus; and
   a determination unit configured to determine whether power is transmitted to a first power receiving apparatus by the first power transmitting unit or the second power transmitting unit, based on a wireless power transmission method supported by the first power receiving apparatus and detected by the detection unit, and a wireless power transmission method supported by a second power receiving apparatus and detected by the detection unit.

2. The apparatus according to claim 1, wherein when the first power transmitting unit is transmitting power to the first power receiving apparatus, the determination unit determines whether to switch power transmission to the first power receiving apparatus from power transmission by the first power transmitting unit to power transmission by the second power transmitting unit, based on the wireless power transmission method supported by the second power receiving apparatus and detected by the detection unit.

3. The apparatus according to claim 1, wherein a communicable distance of communication for controlling power transmission is different between the first wireless power transmission method and the second wireless power transmission method.

4. The apparatus according to claim 1, wherein an amount of power transmissible to a power receiving apparatus is different between the first wireless power transmission method and the second wireless power transmission method.

5. The apparatus according to claim 1, wherein the determination unit determines whether power is transmitted to each of the first power receiving apparatus and the second power receiving apparatus by the first power transmitting unit or the second power transmitting unit in accordance with whether an amount of power transmissible by the first power transmitting unit is exceeded when power is transmitted to the first power receiving apparatus and the second power receiving apparatus by the first power transmitting unit.

6. The apparatus according to claim 2, wherein the determination unit determines whether to switch power transmission to the first power receiving apparatus from power transmission by the first power transmitting unit to power transmission by the second power transmitting unit in accordance with whether the number of power receiving apparatuses to which it is possible to transmit power by the first wireless power transmission method is exceeded when power transmission to the second power receiving apparatus starts while power is transmitted to the first power receiving apparatus by the first power transmitting unit.

7. The apparatus according to claim 1, further comprising a communication unit configured to communicate with a power receiving apparatus,
   wherein after the determination unit determines to change power transmission to the first power receiving apparatus from power transmission by the first power transmitting unit to power transmission by the second power transmitting unit,
   if the communication unit receives control information about the second wireless power transmission method from the first power receiving apparatus,
   the second power transmitting unit starts power transmission to the second power receiving apparatus.

8. The apparatus according to claim 1, further comprising a communication unit configured to communicate with a power receiving apparatus,
   wherein if the determination unit determines to change power transmission to the first power receiving apparatus from power transmission by the first power transmitting unit to power transmission by the second power transmitting unit,
   the second power transmitting unit starts power transmission to the second power receiving apparatus.

9. The apparatus according to claim 1, wherein when power transmission to the first power receiving apparatus is switched from power transmission by the first power transmitting unit to power transmission by the second power transmitting unit, and the first power transmitting unit is transmitting power to the second power receiving apparatus, if power transmission to the second power receiving apparatus is stopped, the power transmitting apparatus returns power transmission to the first power receiving apparatus from power transmission by the second power transmitting unit to power transmission by the first power transmitting unit.

10. The apparatus according to claim 1, wherein when the detection unit detects that the first power receiving apparatus supports the first wireless power transmission method and the second wireless power transmission method, and the first power transmitting unit is transmitting power to the first power receiving apparatus, if the detection unit detects that the second power receiving apparatus supports the first wireless power transmission method, the determination unit determines to change power transmission to the first power receiving apparatus from power transmission by the first power transmitting unit to power transmission by the second power transmitting unit, and determines to transmit power to the second power receiving apparatus by the first power transmitting unit.

11. A control method for a power transmitting apparatus, comprising:
   transmitting power by a first wireless power transmission method;
   transmitting power by a second wireless power transmission method;
   detecting a wireless power transmission method supported by a power receiving apparatus; and
   determining whether power is transmitted to a first power receiving apparatus by a first wireless power transmission method or a second wireless power transmission method, based on a wireless power transmission method supported by the first power receiving apparatus and detected in the detecting, and a wireless power transmission method supported by a second power receiving apparatus and detected in the detecting.

12. A first power receiving apparatus for receiving power wirelessly supplied from a power transmitting apparatus, comprising:
- a detection unit configured to detect a wireless power transmission method supported by a second power receiving apparatus; and
- an instruction unit configured to instruct, to the power transmitting apparatus, a wireless power transmission method to be used for power transmission to the first power receiving apparatus based on a wireless power transmission method supported by the first power receiving apparatus and the wireless power transmission method supported by the second power receiving apparatus and detected by the detection unit.

13. The apparatus according to claim 12, further comprising
- a first power receiving unit configured to receive power by a first wireless power transmission method, and
- a second power receiving unit configured to receive power by a second wireless power transmission method,
- wherein when the first power receiving unit is receiving power from the power transmitting apparatus, the instruction unit instructs to change the wireless power transmission method used by the power transmitting apparatus for power transmission from the first wireless power transmission method to the second wireless power transmission method in accordance with the wireless power transmission method supported by the second power receiving apparatus.

14. The apparatus according to claim 13, wherein when the second power receiving apparatus supports not the first wireless power transmission method but the second wireless power transmission method, the instruction unit instructs to change the wireless power transmission method used by the power transmitting apparatus for power transmission from the first wireless power transmission method to the second wireless power transmission method.

15. The apparatus according to claim 13, wherein the instruction unit instructs the power transmitting apparatus to change the wireless power transmission method used for power transmission to the first power receiving apparatus in accordance with whether an amount of power transmissible by the power transmitting apparatus is exceeded when the power transmitting apparatus transmits power to the first power receiving apparatus and the second power receiving apparatus by the first wireless power transmission method.

16. The apparatus according to claim 13, wherein the instruction unit instructs the power transmitting apparatus to change the wireless power transmission method used for power transmission to the first power receiving apparatus in accordance with whether the number of power receiving apparatuses to which the power transmitting apparatus is capable of transmitting power by the first wireless power transmission method is exceeded when the power transmitting apparatus transmits power to the first power receiving apparatus and the second power receiving apparatus by the first wireless power transmission method.

17. The apparatus according to claim 13, wherein to change power reception to power reception by the second power receiving unit while the first power receiving unit receives power, the instruction unit instructs to change the wireless power transmission method used by the power transmitting apparatus for power transmission to the first power receiving apparatus from the first wireless power transmission method to the second wireless power transmission method by transmitting a signal for ending power transmission by the first wireless power transmission method to the power transmitting apparatus, and transmitting a signal for starting power transmission by the second wireless power transmission method to the power transmitting apparatus.

18. The apparatus according to claim 12, further comprising an input unit configured to input, by a user, a wireless power transmission method to be used by the power transmitting apparatus for power transmission.

19. The apparatus according to claim 13, wherein when the first power receiving apparatus supports the first wireless power transmission method and the second wireless power transmission method, and the first power receiving unit is receiving power, if the detection unit detects that the second power receiving apparatus supports the first wireless power transmission method, the instruction unit instructs the power transmitting apparatus to change power transmission to the first power receiving apparatus from the first wireless power transmission method to the second wireless power transmission method.

20. A control method for a first power receiving apparatus for receiving power wirelessly supplied from a power transmitting apparatus, comprising:
- detecting a wireless power transmission method supported by a second power receiving apparatus; and
- instructing, to the power transmitting apparatus, a wireless power transmission method to be used for power transmission to the first power receiving apparatus based on a wireless power transmission method supported by the first power receiving apparatus and the wireless power transmission method supported by the second power receiving apparatus and detected in the detecting.

21. A non-transitory computer-readable storage medium storing a program for causing a computer to execute a control method for a power transmitting apparatus, the control method comprising:
- transmitting power by a first wireless power transmission method;
- transmitting power by a second wireless power transmission method;
- detecting a wireless power transmission method supported by a power receiving apparatus; and
- determining whether power is transmitted to a first power receiving apparatus by a first wireless power transmission method or a second wireless power transmission method, based on a wireless power transmission method supported by the first power receiving apparatus and detected in the detecting, and a wireless power transmission method supported by a second power receiving apparatus and detected in the detecting.

22. A non-transitory computer-readable storage medium storing a program for causing a computer to execute a control method for a first power receiving apparatus for receiving power wirelessly supplied from a power transmitting apparatus, the control method comprising:
- detecting a wireless power transmission method supported by a second power receiving apparatus; and
- instructing, to the power transmitting apparatus, a wireless power transmission method to be used for power transmission to the first power receiving apparatus based on a wireless power transmission method supported by the first power receiving apparatus and the wireless power transmission method supported by the second power receiving apparatus and detected in the detecting.

* * * * *